United States Patent
Zhang

(10) Patent No.: US 11,234,062 B2
(45) Date of Patent: Jan. 25, 2022

(54) UPLINK ACCESS METHOD AND DEVICE

(71) Applicant: HUAWEI TECHNOLOGIES CO., LTD., Guangdong (CN)

(72) Inventor: Xiaofeng Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/158,119

(22) Filed: Jan. 26, 2021

(65) Prior Publication Data

US 2021/0152899 A1 May 20, 2021

Related U.S. Application Data

(63) Continuation of application No. PCT/CN2018/100012, filed on Aug. 10, 2018.

(51) Int. Cl.
*H04Q 11/00* (2006.01)

(52) U.S. Cl.
CPC . *H04Q 11/0062* (2013.01); *H04Q 2011/0064* (2013.01)

(58) Field of Classification Search
CPC .................................................. H04Q 11/0062
See application file for complete search history.

(56) References Cited

U.S. PATENT DOCUMENTS

2012/0251115 A1* 10/2012 Sarashina .......... H04Q 11/0067
398/72
2015/0244535 A1* 8/2015 Chen ................ H04L 12/40045
713/300
2019/0386843 A1* 12/2019 Oksman .................. H04L 47/72

FOREIGN PATENT DOCUMENTS

| CN | 100373946 C | 3/2008 |
|---|---|---|
| CN | 102098593 A | 6/2011 |
| CN | 106572401 A | 4/2017 |
| WO | 2015100534 A1 | 7/2015 |

OTHER PUBLICATIONS

Q4/15-C22 (Nov. 27, 2017)Study Group 15 English only, Nokia Corporation, G.mgfast: FDMA scheme enabling mgfast lightweight P2MP, International Telecommunication Union, United States [New Orleans], Nov. 27, 2017/Dec. 1, total 4 pages.

(Continued)

*Primary Examiner* — Shi K Li

(57) ABSTRACT

This application provides an uplink access method and a device. The method includes: a network device receiving indication information sent by a terminal device when the terminal device goes online, where the indication information is used to trigger the network device to send uplink registration window indication information on a first port; the uplink registration window indication information indicates a registration window location at which the terminal device sends uplink registration information; and the network device sends the uplink registration window indication information on the first port according to the indication information. According to the technical solutions provided in embodiments of this application, in a P2MP working mode, a network device may be prevented from periodically indicating a registration window, thereby reducing resource overhead and power consumption.

20 Claims, 15 Drawing Sheets

(56) References Cited

OTHER PUBLICATIONS

ITU-T G.9701 (Dec. 2014), Series G: Transmission Systems and Media, Digital Systems and Networks Access networks—Metallic access networks Fast access to subscriber terminals (G.fast) Physical layer specification, total 324 pages.
Q4/15-C37 (Jun. 25, 2018)Study Group 15 English only, Futurewei Technologies US RandD Center, G.mgfast: Registration phase in P2MP, International Telecommunication Union, Belgium, Jun. 25/29, 2018, total 2 pages.
ITU-T G.993.2 (Feb. 2006), Series G: Transmission Systems and Media, Digital Systems and Networks, Digital sections and digital line system—Access networks Very high speed digital subscriber line transceivers 2 (VDSL2), total 252 pages.
Q4/15-C51 (Jun. 25, 2018), Study Group 15 English only, Intel Corporation, Use of G.994.1 handshake for MGFAST in P2MP scenario, International Telecommunication Union, Belgium, Jun. 25/29, 2018, total 9 pages.
International Search Report for PCT/CN2018/100012 dated Aug. 10, 2018, 9 pages.
Extended European Search Report dated Jun. 25, 2021, 12 pages.

* cited by examiner

UPLINK ACCESS METHOD AND DEVICE

CROSS-REFERENCE TO RELATED APPLICATIONS

This application is a continuation of International Application No. PCT/CN2018/100012, filed on Aug. 10, 2018, the disclosure of which is hereby incorporated by reference in its entirety.

TECHNICAL FIELD

This application relates to the communications field, and more specifically, to an uplink access method and device.

BACKGROUND

In fiber to the home (FTTH) represented by a passive optical network (PON), an optical network unit (ONU) may be located at a user's home, to provide higher bandwidth and a higher access network transmission rate. However, the FTTH has insurmountable limitations in aspects such as investment costs, deployment, operation and maintenance, and stability.

To reduce construction costs of the FTTH, the international telecommunication union (ITU) sets up a G.fast project, to study provision of internet access with a higher rate between the ONU and an end user by using a large quantity of laid copper telephone lines and by using obvious advantages of a copper wire access technology such as a digital subscriber line (DSL) in terms of investment, operation and maintenance, and the like in a fiber to the distribution point (FTTdp) scenario. To provide a higher rate for the user, the ITU uses a G.MGfast project to study an application scenario that supports a shorter copper wire distance. To reduce device costs, a G.MGfast system may support point-to-multipoint (P2MP).

In the conventional technology, in a system that supports point-to-multipoint P2MP, a network device periodically sends an uplink random access indication signal to the user, and a newly-online user may send a random access signal in an indicated random access window, so that the new user performs online registration. However, in the conventional technology, when the network device periodically sends the uplink random access indication signal to the user, unnecessary resource overhead are caused.

Therefore, avoiding resource waste caused when the network device periodically indicates the uplink random access indication signal to the user is a problem that needs to be resolved.

SUMMARY

This application provides an uplink access method and device, to prevent, in a P2MP working mode, a network device from periodically indicating a registration window, thereby reducing resource overhead and power consumption.

According to a first aspect, an uplink access method is provided, and the method includes at least: a network device receiving indication information sent by a terminal device when the terminal device goes online, and the network device sending uplink registration window indication information on a first port according to the indication information.

It should be understood that the indication information is used to trigger the network device to send the uplink registration window indication information on the first port, and the uplink registration window indication information indicates a registration window location at which the terminal device sends uplink registration information.

In this embodiment of this application, the network device may distribute user data to user equipment by using a twisted pair (e.g., a telephone line). For example, the network device may be a transceiver unit of the optical network unit (TU-O). The TU-O may distribute the user data to the user equipment by using the twisted pair (for example, the telephone line), and may further receive data sent by a terminal device side.

It should be understood that the network device TU-O is not specifically limited in this embodiment of this application. For example, in a G.fast project, the network device may be a G.fast TU-O (FTU-O). For another example, in a G.MGfast project, the network device may be a G.MGfast TU-O (MTU-O).

The terminal device in this embodiment of this application may be a transceiver unit of a user or in an enterprise, may receive an audio signal (an analog signal) sent by the network device by using a copper twisted pair, and may further send a converted analog signal to a network device side by using the twisted pair. For example, the terminal device may be a transceiver unit at the remote site (TU-R).

It should be understood that the terminal device TU-R is not specifically limited in this embodiment of this application. For example, in the G.fast project, the terminal device may be a G.fast TU-R (FTU-R). For another example, in the G.MGfast project, the terminal device may be a G.MGfast TU-R (MTU-R).

The indication information in this embodiment of this application may be a specific signal that triggers the network device to send the uplink registration window indication information. A frequency band and a signal form that are of the indication information sent by the terminal device when the terminal device goes online are not specifically limited in this embodiment of this application. For example, the indication signal may be a signal carried on a same frequency band and in a same form as an existing handshake toneset R-TONES-REQ signal. For another example, the indication signal may be alternatively a signal (for example, an uplink registration window request signal) carried on a same frequency band as, but in a different form from, the existing handshake toneset signal R-TONES-REQ. For another example, the indication signal may be alternatively another signal (for example, a registration window request signal) carried on a different frequency band from the R-TONES-REQ signal in the existing handshake toneset.

Specifically, the indication information may be alternatively a pseudo noise (PN) sequence or a zadoff-chu (ZC) sequence carried in specific time domain and specific frequency domain. For another example, the indication information may be alternatively a signal that has specific energy on a fixed frequency band at fixed time.

It should be understood that indication information of different forms and on frequency bands may be sent by the terminal device on different channels. The network device may correspondingly receive the indication information from the different channels. In this case, the channel may be understood as an internal receiving processing channel of the network device side.

In this embodiment of this application, there are a plurality of specific implementations in which the network device receives the indication information sent by the terminal device. This is not specifically limited in this application. For example, when the indication signal may be alternatively another signal (for example, the uplink registration window request signal) carried on a different frequency band from the R-TONES-REQ signal in the existing handshake toneset, the network device may receive, on a channel that is of the first port and that is different from the handshake toneset, the indication information sent by the terminal device. For another example, when the indication signal may be the signal carried on the same frequency band and in the same form as the R-TONES-REQ signal in the existing handshake toneset, the network device may receive, in the handshake toneset of the first port, the indication information sent by the terminal device. For another example, when the indication signal may be alternatively the signal (for example, the registration window request signal) carried on the same frequency band as the R-TONES-REQ signal in the existing handshake toneset, but in a different form from the R-TONES-REQ signal, the network device may alternatively receive, in the handshake toneset of the first port, the indication information sent by the terminal device.

With reference to the first aspect, in some implementations of the first aspect, the network device receives, on a first channel of the first port, first indication information sent by the terminal device, and the first indication information is a signal carried on a different frequency band from a frequency band of a second channel.

With reference to the first aspect, in some implementations of the first aspect, the network device receives, on the second channel of the first port, second indication information sent by the terminal device, and the second indication information is a signal carried on a frequency band that is the same as the frequency band of the second channel.

With reference to the first aspect, in some implementations of the first aspect, when the second indication information is a signal carried on a same frequency band as an existing handshake protocol signal R-TONES-REQ on the second channel but in a different signal form from the R-TONES-REQ signal, the network device sends the uplink registration window indication information on the first channel of the first port according to the first indication information.

With reference to the first aspect, in some implementations of the first aspect, when the second indication information is a signal in a same form as the existing handshake protocol signal R-TONES-REQ on the second channel, the method further includes: the network device performing a handshake protocol procedure on the second channel of the first port.

According to a second aspect, an uplink access method is provided, and the method includes: a terminal device sending indication information to a network device on a second port when the terminal device goes online, where the indication information is used to trigger the network device to send uplink registration window indication information on a first port, the uplink registration window indication information indicating a registration window location at which the terminal device sends uplink registration information, and the second port corresponding to the first port on which the network device receives the indication information; and the terminal device receiving, on the second port, the uplink registration window indication information sent by the network device.

With reference to the second aspect, in some implementations of the second aspect, the terminal device sends first indication information to the network device on a first channel of the second port, and the first indication information is a signal carried on a different frequency band from a frequency band of a second channel.

With reference to the second aspect, in some implementations of the second aspect, the terminal device sends second indication information to the network device on the second channel of the second port, and the second indication information is a signal carried on a frequency band that is the same as the frequency band of the second channel.

With reference to the second aspect, in some implementations of the second aspect, before the terminal device sends the second indication information to the network device on the second channel of the second port, the method further includes: when the terminal device detects an existing handshake protocol signal on the second channel, the terminal device waits for completion of a handshake protocol procedure.

With reference to the second aspect, in some implementations of the second aspect, the method further includes: when the terminal device does not receive the uplink registration window indication information on the second port before timeout, the terminal device sends the second indication information to the network device on the second channel of the second port.

Optionally, in some embodiments, if the terminal device does not receive a response message to the second indication information from the network device on the second port before timeout, the terminal device may continue to attempt to send the first indication information to the network device on the first channel of the second port. In this way, cyclic attempts are made to send the first indication information or the second indication information.

With reference to the second aspect, in some implementations of the second aspect, before the terminal device sends the indication information to the network device, the method further includes: when the terminal device receives the uplink registration window indication information on the first channel of the second port, the terminal device sends registration information to the network device at an indicated registration window location.

According to a third aspect, a network device is provided, and includes a first receiving module and a sending module.

The first receiving module is configured to receive indication information sent by a terminal device when the terminal device goes online.

The sending module is configured to send uplink registration window indication information on a first port according to the indication information.

It should be understood that the indication information is used to trigger the network device to send the uplink registration window indication information on the first port, and the uplink registration window indication information indicates a registration window location at which the terminal device sends uplink registration information.

With reference to the third aspect, in some implementations of the third aspect, the first receiving module is configured to receive, on a first channel of the first port, first indication information sent by the terminal device, and the first indication information is a signal carried on a different frequency band from a frequency band of a second channel.

With reference to the third aspect, in some implementations of the third aspect, the first receiving module is further configured to receive, on the second channel of the first port, second indication information sent by the terminal device, and the second indication information is a signal carried on a frequency band that is the same as the frequency band of the second channel.

With reference to the third aspect, in some implementations of the third aspect, when the second indication information is a signal carried on a same frequency band as an existing handshake protocol signal R-TONES-REQ on the second channel but in a different signal form from the R-TONES-REQ signal, the sending module is configured to send the uplink registration window indication information on the first channel of the first port according to the first indication information.

With reference to the third aspect, in some implementations of the third aspect, when the second indication information is a signal in a same form as the existing handshake protocol signal R-TONES-REQ on the second channel, the sending module is further configured to perform a handshake protocol procedure on the second channel of the first port.

According to a fourth aspect, a terminal device is provided, and the terminal device includes a first sending module and a first receiving module.

The first sending module is configured to send indication information to a network device when the terminal device goes online.

The first receiving module is configured to receive, on a second port, uplink registration window indication information sent by the network device.

The indication information is used to trigger the network device to send the uplink registration window indication information on a first port, and the uplink registration window indication information indicates a registration window location at which the terminal device sends uplink registration information.

It should be understood that the second port corresponds to the first port on which the network device receives the indication information.

With reference to the fourth aspect, in some implementations of the fourth aspect, the first sending module is configured to send the first indication information to the network device on a first channel of the second port, and the first indication information is a signal carried on a different frequency band from a frequency band of a second channel.

With reference to the fourth aspect, in some implementations of the fourth aspect, the first sending module is configured to send second indication information to the network device on the second channel of the second port, and the second indication information is a signal carried on a frequency band that is the same as the frequency band of the second channel.

With reference to the fourth aspect, in some implementations of the fourth aspect, the terminal device further includes a processing module.

The processing module is configured to: when the terminal device detects an existing handshake protocol signal on the second channel, wait for completion of a handshake protocol procedure.

With reference to the fourth aspect, in some implementations of the fourth aspect, the terminal device further includes a second sending module.

The second sending module is configured to: when the uplink registration window indication information is not received on the second port before timeout, send the second indication information to the network device on the second channel of the second port.

With reference to the fourth aspect, in some implementations of the fourth aspect, the terminal device further includes a second receiving module.

The second receiving module is configured to: when the uplink registration window indication information is received on the first channel of the second port, send, by the terminal device, registration information to the network device at the indicated registration window location.

According to a fifth aspect, a network device is provided, and the network device includes a memory, a processor, and a transceiver.

The memory is configured to store a program. The processor is configured to execute the program stored in the memory, and when the program is executed, the processor performs the method in any one of the first aspect or the possible implementations of the first aspect (e.g., by using the transceiver). The processor may be communicatively connected to the transceiver. The memory may be configured to store program code and data of the network device. Therefore, the memory may be an internal storage unit of the processor, may be an external storage unit independent of the processor, or may be a part including an internal storage unit of the processor and an external storage unit independent of the processor.

Optionally, the processor may be a general-purpose processor, and may be implemented by using hardware or software. When being implemented by using hardware, the processor may be a logic circuit, an integrated circuit, or the like. When being implemented by using software, the processor may be a general-purpose processor, and is implemented by reading software code stored in the memory. The memory may be integrated into the processor, or may be located outside the processor and exist independently.

When the program is executed, the transceiver is configured to receive indication information sent by a terminal device when the terminal device goes online.

The processor is configured to execute the program stored in the memory, and when the program is executed, the transceiver performs the following step by using the processor:

sending uplink registration window indication information on a first port according to the indication information.

It should be understood that the indication information is used to trigger the network device to send the uplink registration window indication information on the first port, and the uplink registration window indication information indicates a registration window location at which the terminal device sends uplink registration information.

With reference to the fifth aspect, in some implementations of the fifth aspect, the transceiver is configured to receive, on a first channel of the first port, first indication information sent by the terminal device, and the first indication information is a signal carried on a different frequency band from a frequency band of a second channel.

With reference to the fifth aspect, in some implementations of the fifth aspect, the transceiver is further configured to receive, on the second channel of the first port, second indication information sent by the terminal device, and the second indication information is a signal carried on a frequency band that is the same as the frequency band of the second channel.

With reference to the fifth aspect, in some implementations of the fifth aspect, when the second indication information is a signal carried on a same frequency band as an existing handshake protocol signal R-TONES-REQ on the second channel but in a different signal form from the R-TONES-REQ signal, the transceiver is configured to send the uplink registration window indication information on the first channel of the first port according to the first indication information.

With reference to the fifth aspect, in some implementations of the fifth aspect, when the second indication information is a signal in a same form as the R-TONES-REQ signal in the existing handshake protocol of the second channel, the transceiver is configured to perform a handshake protocol procedure on the second channel of the first port.

According to a sixth aspect, a terminal device is provided, and the terminal device includes a memory, a processor, and a transceiver.

The memory is configured to store a program. The processor is configured to execute the program stored in the memory, and when the program is executed, the processor performs the method in any one of the first aspect or the possible implementations of the first aspect (e.g., by using the transceiver). The processor may be communicatively connected to the transceiver. The memory may be configured to store program code and data of the terminal device. Therefore, the memory may be an internal storage unit of the processor, may be an external storage unit independent of the processor, or may be a part including an internal storage unit of the processor and an external storage unit independent of the processor.

Optionally, the processor may be a general-purpose processor, and may be implemented by using hardware or software. When being implemented by using hardware, the processor may be a logic circuit, an integrated circuit, or the like. When being implemented by using software, the processor may be a general-purpose processor, and is implemented by reading software code stored in the memory. The memory may be integrated into the processor, or may be located outside the processor and exist independently.

When the program is executed, the transceiver is configured to send indication information to a network device when the terminal device goes online.

The transceiver is further configured to receive, on a second port, uplink registration window indication information sent by the network device.

The indication information is used to trigger the network device to send the uplink registration window indication information on a first port, and the uplink registration window indication information indicates a registration window location at which the terminal device sends uplink registration information.

It should be understood that the second port corresponds to the first port on which the network device receives the indication information.

With reference to the sixth aspect, in some implementations of the sixth aspect, the transceiver is configured to send first indication information to the network device on a first channel of the second port, and the first indication information is a signal carried on a different frequency band from a frequency band of a second channel.

With reference to the sixth aspect, in some implementations of the sixth aspect, the transceiver is configured to send second indication information to the network device on the second channel of the second port, and the second indication information is a signal carried on a frequency band that is the same as the frequency band of the second channel.

With reference to the sixth aspect, in some implementations of the sixth aspect, the processor is configured to: when the terminal device detects an existing handshake protocol signal on the second channel, wait for completion of a handshake protocol procedure.

The transceiver is further configured to: when the uplink registration window indication information is not received on the second port before timeout, send, by the terminal device, the second indication information to the network device on the second channel of the second port.

With reference to the sixth aspect, in some implementations of the sixth aspect, the transceiver is further configured to: when the uplink registration window indication information is received on the first channel of the second port, send, by the terminal device, registration information to the network device at the indicated registration window location.

According to a seventh aspect, a chip is provided, and includes a memory, a processor, and a transceiver.

The processor may be communicatively connected to the transceiver. The memory may be configured to store program code and data of the network device. Therefore, the memory may be an internal storage unit of the processor, may be an external storage unit independent of the processor, or may be a part including an internal storage unit of the processor and an external storage unit independent of the processor.

Optionally, the processor may be a general-purpose processor, and may be implemented by using hardware or software. When being implemented by using hardware, the processor may be a logic circuit, an integrated circuit, or the like. When being implemented by using software, the processor may be a general-purpose processor, and is implemented by reading software code stored in the memory. The memory may be integrated into the processor, or may be located outside the processor and exist independently.

When a program is executed, the transceiver performs any one of the first aspect or the possible implementations of the first aspect by using the processor.

According to an eighth aspect, a chip is provided, and includes a memory, a processor, and a transceiver.

The processor may be communicatively connected to the transceiver. The memory may be configured to store program code and data of the terminal device. Therefore, the memory may be an internal storage unit of the processor, may be an external storage unit independent of the processor, or may be a part including an internal storage unit of the processor and an external storage unit independent of the processor.

Optionally, the processor may be a general-purpose processor, and may be implemented by using hardware or software. When being implemented by using hardware, the processor may be a logic circuit, an integrated circuit, or the like. When being implemented by using software, the processor may be a general-purpose processor, and is implemented by reading software code stored in the memory. The memory may be integrated into the processor, or may be located outside the processor and exist independently.

When a program is executed, the transceiver performs any one of the second aspect or the possible implementations of the second aspect by using the processor.

According to a ninth aspect, a computer readable storage medium is provided, and includes a computer program, and when the computer program runs on a computer, the computer is enabled to perform the method according to any one of the first aspect or the implementations of the first aspect.

According to a tenth aspect, a computer readable storage medium is provided, and includes a computer program, and when the computer program runs on a computer, the computer is enabled to perform the method according to any one of the second aspect or the implementations of the second aspect.

According to an eleventh aspect, a computer program product is provided, and when the computer program product runs on a computer, the computer is enabled to perform the method according to any one of the first aspect or the implementations of the first aspect.

According to a twelfth aspect, a computer program product is provided, and when the computer program product runs on a computer, the computer is enabled to perform the method according to any one of the second aspect or the implementations of the second aspect.

According to a thirteenth aspect, a system is provided, and includes the foregoing terminal device and network device.

DESCRIPTION OF EMBODIMENTS

Figure 1:
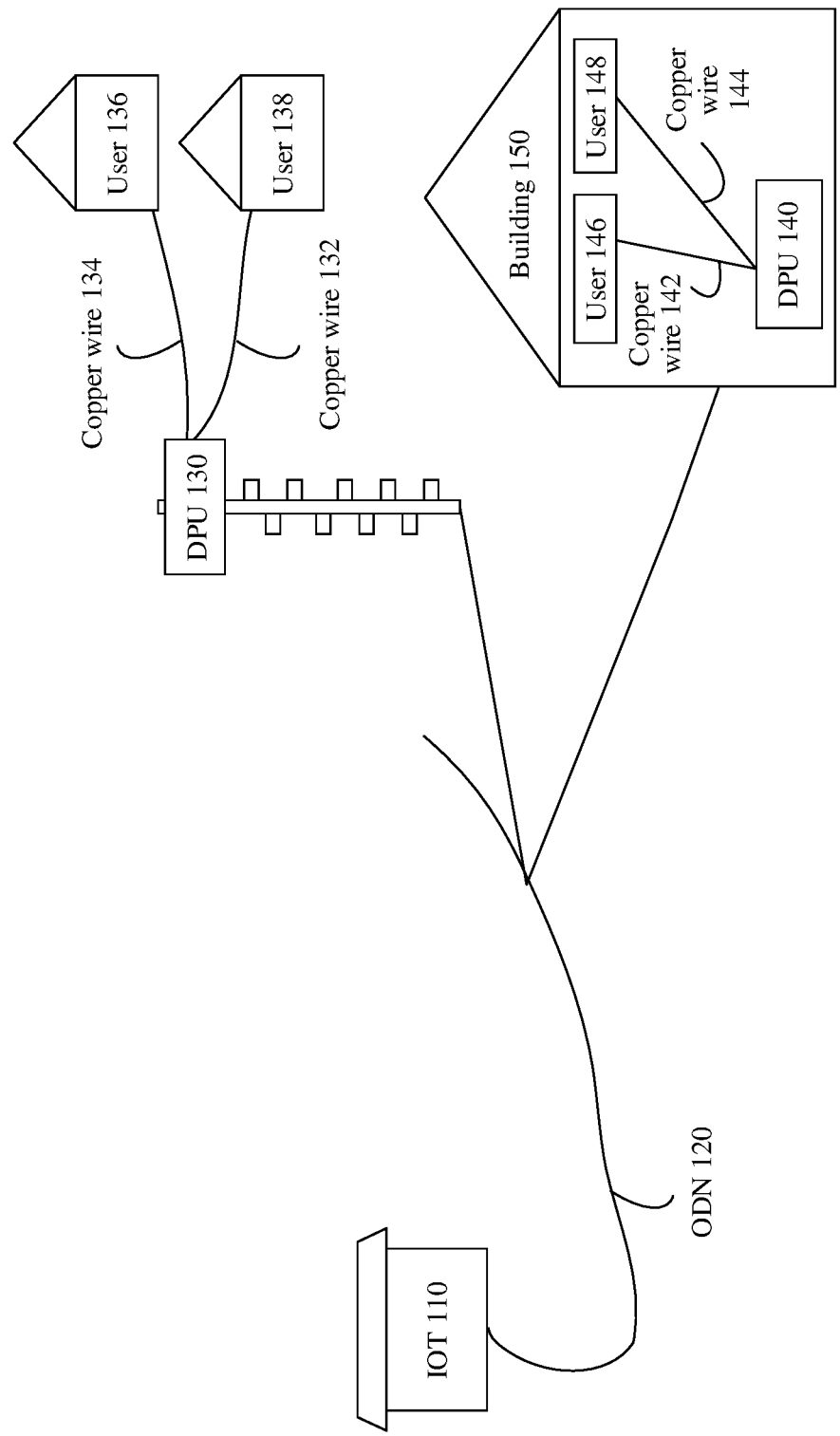
FIG. 1 is a schematic diagram of an application scenario of a G.MGfast device according to an embodiment of this application.

The following describes technical solutions of this application with reference to the accompanying drawings.

A passive optical fiber network (PON) may mean that only an optical fiber is used as a transmission medium between a central office device and user equipment. The PON may include an optical line terminal (OLT), an optical distribution network (ODN), an optical network unit (ONU), and the like. The following separately describes devices in the PON in detail.

The optical line terminal (OLT) may be an important central office device, and may be connected to a front-end switch by using a network cable, and convert data into an optical signal. The OLT may provide an interface for the optical distribution network (ODN), may be connected to one or more ODNs, and may provide a transmission manner for an interface required by the optical network unit (ONU).

The optical distribution network (ODN) may be a fiber optic network of a PON device, and may provide an optical transmission channel between the OLT and the ONU.

The optical network unit (ONU) may be a fiber-to-the-x terminal device (e.g., a fiber-terminated device in an optical fiber access network), and may be located at a user side. Based on a location of the ONU at the user side, there may be the following several optical fiber access manners: fiber to the home (FTTH), fiber to the building (FTTB), fiber to the curb (FTTC), fiber to the office (FTTO), fiber to the zone (FTTZ), fiber to the pole (FTTP), and the like. It should be noted that an optical network terminal (ONT) may also be used as an ONU.

In fiber to the home (FTTH) represented by the passive optical network (PON), the ONU may be located at a user's home, to provide higher bandwidth and a higher access network transmission rate. However, the FTTH has insurmountable limitations in aspects such as investment costs, deployment, operation and maintenance, and stability.

To reduce construction costs of the FTTH, the ONU may be disposed at locations such as a building, a roadside, an office building, a community, a pole, and the like (which may correspond to different optical fiber access manners mentioned above, such as FTTB, FTTC, FTTO, FTTZ, and FTTP), and a large quantity of laid copper telephone lines may be fully used to provide a broadband access service for a "last kilometer" between the ONU and an end user.

The international telecommunication union (ITU) sets up a G.fast project, to study provision of internet access with a higher rate between the ONU and the end user by using the large quantity of laid copper telephone lines and by using obvious advantages of a copper wire access technology such as a digital subscriber line (DSL) in terms of investment, operation and maintenance, and the like in a fiber to the distribution point (FTTdp) scenario. An objective of the G.fast project may be to provide an access rate up to 1 Gbit/s for the user.

To provide a higher rate for the user, the ITU uses a G.MGfast project to study an application scenario that supports a shorter copper wire distance. To reduce device costs, a G.MGfast system may support point-to-multipoint (P2MP). In the G.MGfast system, network data may be distributed on a copper telephone line to user equipment by using a G.MGfast device, and may provide internet access with a higher rate for the user equipment.

The following describes an application scenario of the G.MGfast device in this embodiment of this application in detail with reference to FIG. 1.

FIG. 1 is a schematic diagram of an application scenario of a G.MGfast device according to an embodiment of this application. As shown in FIG. 1, the application scenario of the G.MGfast device may include an optical line terminal OLT 110, an optical distribution network ODN 120, and two decentralized processing units (DPU) (for example, a DPU 130 and a DPU 140). Each DPU may include an optical network unit (ONU) and a G.MGfast device. Each DPU may carry two users (for example, users carried by the DPU 130 include a user 136 and a user 138, and users carried by the DPU 140 include a user 146 and a user 148).

It should be noted that, in the application scenario of the G.MGfast device, there may be a plurality of decentralized processing units DPUs, and each DPU may also carry a plurality of users. In the scenario in FIG. 1, a quantity of DPUs and a quantity of users are merely used as an example. This is not specifically limited in this application.

It should be understood that in the application scenario shown in FIG. 1, the DPU 130 may be a scenario in which the ONU is disposed on a roadside (for example, an FTTC technology), and the DPU 140 may be a scenario in which the ONU is disposed in a building 150 (for example, an FTTB technology). A specific application scenario of the G.MGfast device is not limited in this embodiment of this application, and may be alternatively a scenario such as FTTO, FTTZ, or FTTP.

The DPU 130 is used as an example below for detailed description. As a central office device, the optical line terminal OLT 110 may distribute user data to the decentralized processing unit DPU 130 by using the ODN 120 through a fiber optic network. An ONU inside the DPU 130 and the G.MGfast device distribute, on a copper wire 134, the user data to a modem of the user 136 (the modem may also be understood as a "modem" at a home of the user 136, and may be responsible for conversion between an analog signal and a digital signal), and may distribute, on a copper wire 132, the user data to a modem of the user 138.

The DPU 140 is used as an example below for detailed description. As a central office device, the optical line terminal OLT 110 may distribute user data to the decentralized processing unit DPU 140 by using the ODN 120 through a fiber optic network. An ONU inside the DPU 140 and the G.MGfast device distribute, on a copper wire 142, the user data to a modem of the user 146 in a building, and may distribute, on a copper wire 144, the user data to a modem of the user 148.

When a point-to-multipoint P2MP working mode (e.g., the DPU may carry a plurality of users) may be supported between the DPU and the user, an uplink access problem exists among the plurality of users (because the user is in an out-of-order state before registration, this may also be referred to as random access). When the user goes online, user registration and corresponding ranging need to be performed, so that an uplink transmission resource is subsequently allocated to the user.

Specifically, a specific reference model in which the decentralized processing unit DPU 130 distributes the data to the user 136 by using the copper wire is described in detail below with reference to FIG. 2.

Figure 2:
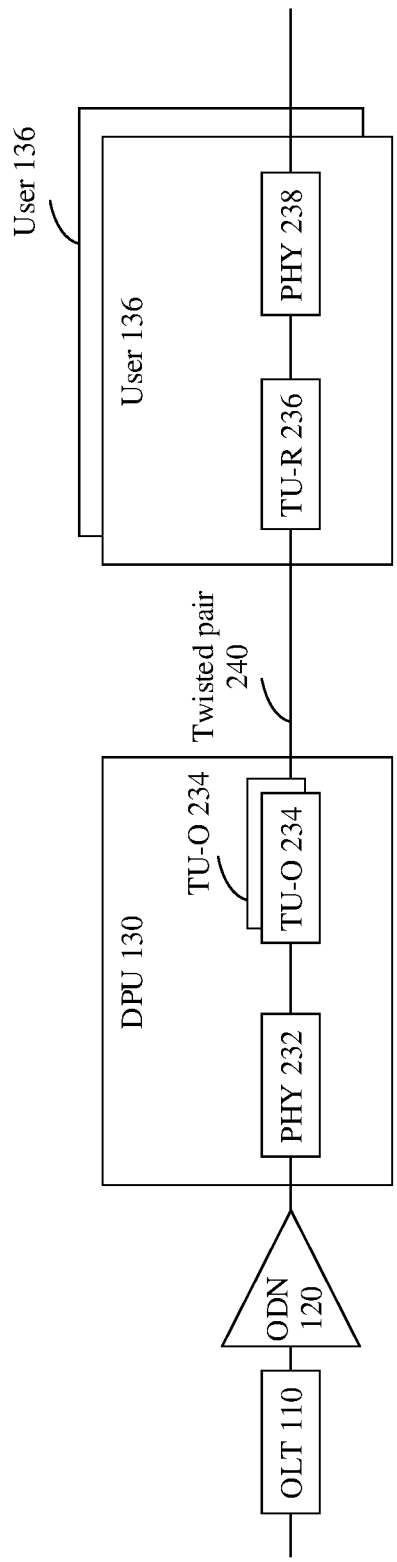
FIG. 2 is a schematic diagram of a G.MGfast reference model according to an embodiment of this application.

FIG. 2 is a schematic diagram of a G.MGfast reference model according to an embodiment of this application. As shown in FIG. 2, the G.MGfast reference model may include an OLT 110, an ODN 120, a DPU 130, a port physical layer (PHY) 232, a transceiver unit the optical network unit (TU-O) 234, a twisted pair 240, a user 136, a PHY 238, and a transceiver unit at the remote site (TU-R) 236.

As shown in FIG. 2, for a downlink, the optical line terminal OLT 110 may transmit data to the decentralized processing unit DPU 130 by using the optical distribution network ODN 120. The port physical layer PHY 232 in the DPU 130 may be used as an access network, and may distribute, on the twisted pair 240, received data to a modem at a home of the user 136 by using the TU-O 234. The modem at the home of the user 136 may receive the data by using the TU-R 236 and may send the data to a computer.

It should be understood that the distributed processing unit DPU 130 may be used as a network device, and may distribute user data to the user 136 by using the twisted pair. The TU-O 234 and the TU-R 236 may be respectively used as a transceiver unit in the DPU 130 and a transceiver unit of the user 136.

In this embodiment of this application, the DPU 130 may have a plurality of ports (or may be understood as including a plurality of TUs-O), and each port may carry one or more users 136. For example, if a port in the DPU 130 carries one user 136, the port may support a point-to-point (P2P) protocol, and the DPU 130 and the user 136 may work in a P2P working mode. For another example, if a port in the DPU 130 carries a plurality of users 136, the port may support a P2MP protocol, and the DPU 130 and the users 136 may work in a P2MP working mode.

It should be understood that a terminal device and a network device that support the P2MP working mode may also support the P2P working mode. A specific mode in which the terminal device and the network device work may be negotiated by both parties. Detailed descriptions are provided below with reference to a specific embodiment.

Still as shown in FIG. 2, for an uplink, the user 136 may perform uplink random access by using the TU-R 236 when the user 136 needs to go online. The TU-O 234 in the DPU 130 may complete registration in response to a registration response of the user 136 based on a supported working mode.

An uplink random access process of the terminal device is described in detail below.

In the P2MP working mode, the TU-O 234 (used as a network device) inside the DPU 130 needs to send an uplink random access window indication to the TU-R 236 (used as a terminal device) of the user 136. The terminal device may send, at a specified window location, a message that carries an ID, and the network device may send, on a downlink channel, a response message that carries the ID, and further perform authentication and determine a conflict, to complete user registration.

In the conventional technology, in the P2MP working mode, the network device periodically indicates a random access window location to the network device, so that the terminal device may send a registration message at the specified window location. In one aspect, because a quantity of terminal devices carried by the network device is relatively small, and a random access probability is relatively low, resource waste is caused when the network device periodically indicates a registration window. In another aspect, if the terminal device carried by the network device does not work, a transmit end of the network device needs to keep in a working state. Therefore, a problem such as relatively large power consumption is caused when the network device periodically indicates the registration window.

Based on an uplink access method provided in an embodiment of this application, a network device may be prevented from periodically indicating a registration window, thereby reducing resource overhead and power consumption.

An uplink access method provided in an embodiment of this application is described in detail below with reference to FIG. 3.

Figure 3:
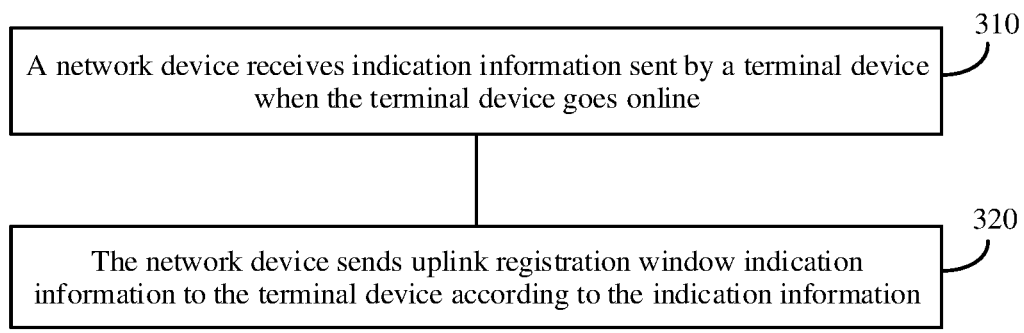
FIG. 3 is a schematic flowchart of an uplink access method according to an embodiment of this application.

FIG. 3 is a schematic flowchart of an uplink access method according to an embodiment of this application. The method shown in FIG. 3 may include steps 310 and 320. Steps 310 and 320 are separately described in detail below.

Step 310: A network device receives indication information sent by a terminal device when the terminal device goes online.

In this embodiment of this application, the network device may distribute user data to user equipment by using a twisted pair (e.g., a telephone line). For example, the network device may be the TU-O 234 shown in FIG. 2. The TU-O 234 may distribute the user data to the user equipment by using the twisted pair (for example, the telephone line), and may further receive data sent by a terminal device side.

It should be understood that the network device TU-O is not specifically limited in this embodiment of this application. For example, in a G.fast project, the network device may be an FTU-O. For another example, in a G.MGfast project, the network device may be an MTU-O.

The terminal device in this embodiment of this application may be a transceiver unit of a user or in an enterprise, may receive an audio signal (e.g., an analog signal) sent by the network device by using a copper twisted pair, and may further send a converted analog signal to a network device side by using the twisted pair. For example, the terminal device may be the TU-R 236 shown in FIG. 2.

It should be understood that the terminal device TU-R is not specifically limited in this embodiment of this application. For example, in the G.fast project, the terminal device may be an FTU-R. For another example, in the G.MGfast project, the terminal device may be an MTU-R.

When the terminal device needs to go online, the terminal device may send the indication information to the network device, and the indication information may be used to trigger the network device to send registration window indication information to the terminal device. If the terminal device may detect the registration window indication information sent by the network device, the terminal device may perform uplink registration based on a registration window location indicated by the network device. After successful registration, the terminal device may enter a subsequent initialization procedure, such as a handshake procedure. The handshake procedure is described in detail below with reference to FIG. 4.

The indication information in this embodiment of this application may be a specific signal that triggers the network device to send the registration window indication information. A frequency band and a signal form that are of the indication information sent by the terminal device when the terminal device goes online are not specifically limited in this embodiment of this application. For example, the indication signal may be a signal carried on a same frequency band and in a same form as an existing remote handshake toneset request signal R-TONES-REQ. For another example, the indication signal may be alternatively a signal (for example, an uplink registration window request signal) carried on the same frequency band as the R-TONES-REQ signal in the existing handshake toneset but in a different form from the R-TONES-REQ signal. For another example, the indication signal may be alternatively another signal (for example, a registration window request signal) carried on a different frequency band from the R-TONES-REQ signal in the existing handshake toneset.

Specifically, the indication information may be a pseudo noise (pseudo noise, PN) sequence or a Zadoff-Chu (ZC) sequence carried in specific time domain and specific frequency domain. For another example, the indication information may be alternatively a signal that has specific energy on a fixed frequency band at fixed time.

It should be understood that indication information in different forms and on frequency bands may be sent by the terminal device on different channels. The network device may correspondingly receive the indication information from the different channels. In this case, the channel may be understood as an internal receiving processing channel of the network device side.

In this embodiment of this application, there are a plurality of specific implementations in which the network device receives the indication information sent by the terminal device. This is not specifically limited in this application.

For example, when the indication signal may be alternatively another signal (for example, an uplink registration window request signal) carried on a different frequency band from the R-TONES-REQ signal in the existing handshake toneset, the network device may receive, on a channel that is of a first port and that is different from the handshake toneset, an uplink registration window request signal sent by the terminal device. As another example, when the indication signal may be the signal carried on the same frequency band and in the same form as the R-TONES-REQ signal in the existing handshake toneset, the network device may receive, in the handshake toneset of the first port, an R-TONES-REQ signal sent by the terminal device. As another example, when the indication signal may be alternatively the signal (for example, a registration window request signal) carried on the same frequency band as the R-TONES-REQ signal in the existing handshake toneset but in a different form from the R-TONES-REQ signal, the network device may alternatively receive, in the handshake toneset of the first port, a registration window request signal sent by the terminal device. Detailed descriptions are provided below with reference to FIG. 5 to FIG. 12.

Step 320: The network device sends uplink registration window indication information to the terminal device according to the indication information.

The network device may send the uplink registration window indication information to the terminal device according to the received indication information. The terminal device may send uplink registration information at an indicated registration window location, to enter a P2MP working mode.

It should be understood that an implementation in which the network device sends the uplink registration window indication information to the terminal device according to the indication information is not limited in this embodiment of this application. For example, the network device may send the uplink registration window indication information on a channel (which may be understood as a P2MP downlink broadcast channel) that is in the first port and that is different from the handshake toneset. For example, the network device may alternatively send the uplink registration window indication information in the handshake toneset of the first port.

In this embodiment of this application, in the P2MP working mode, the network device may be prevented from periodically indicating a registration window, thereby reducing resource overhead and power consumption.

A handshake working procedure in this embodiment of this application is described in detail below with reference to FIG. 4.

Figure 4:
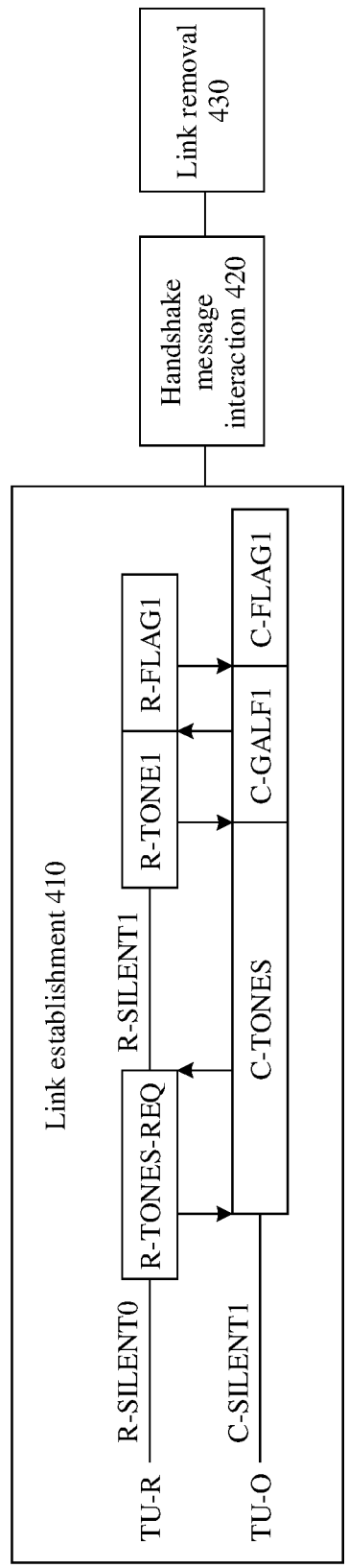
FIG. 4 is a schematic block diagram of a handshake protocol according to an embodiment of this application.

FIG. 4 is a schematic block diagram of a handshake protocol according to an embodiment of this application. As shown in FIG. 4, a handshake protocol procedure may include three stages: link establishment 410, handshake message interaction 420, and link removal 430.

A handshake protocol is described in detail below by using the link establishment 410 as an example.

A TU-R is initially in a transmission silent state (for example, an R-SILENT0 signal), and a TU-O is also initially in the transmission silent state (for example, a C-SILENT1 signal). The TU-R may start a program by sending one or more signals (for example, an R-TONES-REQ signal) in signal families of the TU-R, and phases of the plurality of signals are inverted every 16 ms. After the TU-O detects the R-TONES-REQ signal sent by the TU-R, the TU-O may respond by sending one or more signals (for example, a C-TONES signal) in a signal family of the TU-O. After the TU-R detects the C-TONES signal sent by the TU-O, the TU-R may maintain the transmission silent state (for example, an R-SILENT1 signal) for 50 ms to 500 ms, and then the TU-R may send only one signal (for example, an R-TONE1 signal) in one signal family of the TU-R. After the TU-O detects the R-TONE1 signal sent by the TU-R, the TU-O may respond by sending a GALF signal (for example, a C-GALF1 signal) on a modulation carrier. After the TU-R detects the C-TONES signal sent by the TU-O, the TU-R may respond by sending a FLAG signal (for example, an R-FLAG1 signal) on the modulation carrier. After the TU-O detects the R-FLAG1 signal sent by the TU-R, the TU-O may respond by sending a GALF signal (for example, a C-FLAG1 signal) on the modulation carrier. After the TU-R detects the C-FLAG1 signal sent by the TU-O, the TU-R may perform data transmission for a first time.

There are a plurality of specific implementations for step 310. Optionally, in some embodiments, when the indication signal sent by the terminal device is another signal (for example, an uplink registration window request signal) carried on a different frequency band from the R-TONES-REQ signal in the existing handshake toneset, the network device may receive, on a channel (which may be understood as a P2MP channel) that is of the first port and that is different from the handshake toneset, an uplink registration window request signal sent by the terminal device. The following describes, in detail with reference to FIG. 5, a specific implementation in which the network device may receive, on the channel (which may be understood as the P2MP channel) that is of the first port and that is different from the handshake toneset, the uplink registration window request signal sent by the terminal device.

Figure 5:
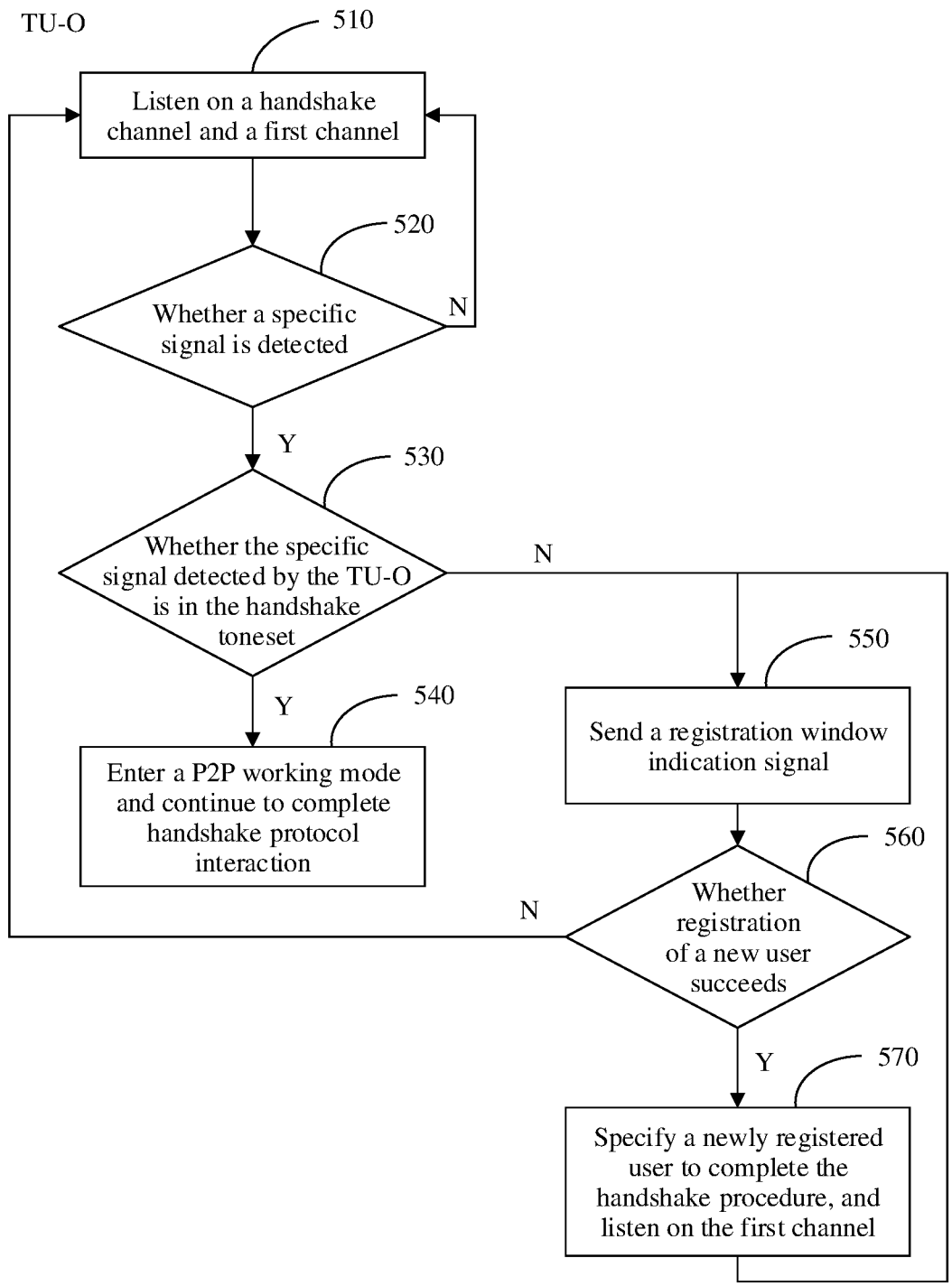
FIG. 5 is a schematic diagram of a possible working procedure of a network device in step 310 in FIG. 3.

Optionally, in some embodiments, based on FIG. 5, the network device may further detect, in the handshake toneset of the first port, whether there is an R-TONES-REQ signal that is in the handshake protocol and that is sent by the terminal device. If the network device receives, in the handshake toneset of the first port, the R-TONES-REQ signal sent by the terminal device, the network device may enter a P2P working mode.

In this embodiment of this application, a P2P device and a P2MP device may be simultaneously compatible.

The following describes, in more detail with reference to a specific example in FIG. 5, a specific implementation in which when the indication signal sent by the terminal device in this embodiment of this application is another signal (for example, an uplink registration window request signal) carried on a different frequency band from the R-TONES-REQ signal in the existing handshake toneset, the network device may receive, on an uplink channel (which may be understood as a P2MP uplink channel) that is of the first port and that is different from the handshake toneset, the uplink registration window request signal sent by the terminal device. It should be noted that the example in FIG. 5 is merely intended to help a person skilled in the art understand the embodiments of this application, and is not intended to limit the embodiments of this application to a specific value or a specific scenario of the example. The person skilled in the art may apparently make various equivalent modifications or changes based on the example shown in FIG. 5, and such modifications and changes also fall within the scope of the embodiments of this application.

FIG. 5 is a schematic diagram of a possible working procedure of a network device in step 310 in FIG. 3. A method shown in FIG. 5 may include steps 510 to 570. Steps 510 to 570 are separately described in detail below.

It should be understood that the network device in FIG. 5 may correspond to the TU-O 234 shown in FIG. 2. A working procedure of the TU-O is used as an example below for detailed description.

For ease of description, in this embodiment of this application, a channel different from a handshake toneset is referred to as a first channel.

Step 510: The TU-O simultaneously detects the handshake toneset and the first channel After being powered on, the TU-O may simultaneously listen on a handshake toneset and a first channel of a port.

Step 520: Determine whether the TU-O detects a specific signal in the handshake toneset or on the first channel.

If the TU-O detects the specific signal in the handshake toneset or on the first channel, the TU-O may perform step 530. If the TU-O does not detect the specific signal in the handshake toneset or on the first channel, the TU-O may perform step 510 again to listen on the handshake toneset and the first channel again.

Step 530: Determine whether the specific signal detected by the TU-O is in the handshake toneset.

If the TU-O detects, in the handshake toneset, a specific signal sent by the terminal device (e.g., the TU-R mentioned above), for example, the R-TONES-REQ signal shown in FIG. 4, the TU-O may perform step 540. If the TU-O does not detect, in the handshake toneset, the specific signal sent by the terminal device, but the TU-O detects, on the first channel, the specific signal sent by the terminal device, for example, an uplink registration window request signal, the TU-O may perform step 550.

Step 540: The TU-O enters a P2P working mode.

If the TU-O detects the specific signal (for example, the R-TONES-REQ signal shown in FIG. 4) in the handshake toneset, the TU-O may enter the P2P working mode and may continue to complete a subsequent handshake protocol.

It should be noted that if the TU-O later works in the P2P working mode, the TU-O no longer supports a P2MP working mode.

Step 550: The TU-O sends an uplink registration window indication signal on the first channel.

If the TU-O detects, on the first channel, a specific signal (for example, an uplink registration window request signal) sent by the TU-R, the TU-O may send the uplink registration window indication signal on the first channel. The uplink registration window indication signal may indicate the TU-R to send uplink registration information at a specified window location.

Optionally, before sending the uplink registration window indication signal on the first channel, the TU-O may further send a training sequence, and the training sequence may be used for synchronization and training of a downlink channel of the TU-R.

Step 560: Determine whether registration of a new user succeeds.

If the TU-O detects, in an indicated registration window, the uplink registration information sent by the TU-R, and responds to correctly parsed uplink registration information, the TU-O may complete registration of the new user, and may perform step 570 and work in the P2MP working mode.

If the TU-O does not detect, in the indicated registration window, the uplink registration information sent by the TU-R, the TU-O may perform step 510 to listen on the handshake toneset and the first channel again.

Step 570: The TU-O specifies that a newly registered user completes a handshake procedure, and detects the first channel.

After entering the P2MP working mode, the TU-O may allocate an ID to a successfully registered TU-R. The TU-O may specify that the TU-R enters a subsequent initialization procedure, such as a handshake protocol procedure.

It should be noted that if the TU-O already works in the P2MP working mode, the TU-O may subsequently perform step 550, may detect whether there is, only on the first channel, the specific signal sent by the TU-R, and may complete registration of the new user based on steps 550 to 570.

In the P2MP working mode, the network device provided in this embodiment of this application may be prevented from periodically indicating a registration window, thereby reducing resource overhead and power consumption. In addition, the network device may be further compatible with both a device in the P2P working mode and a device in the P2MP working mode.

Corresponding to the implementation in which the network device shown in FIG. 5 receives, on the channel (which may be understood as the P2MP channel) that is of the first port and that is different from the handshake toneset, the uplink registration window request signal sent by the terminal device (for example, the TU-R), an implementation in which the terminal device sends first indication information is not specifically limited in this embodiment of this application. For example, after determining that the P2MP working mode may be supported, the terminal device may send the uplink registration window request signal on a channel that is different from the handshake toneset, and may send the uplink registration information based on a registration window location indicated by the network device. For another example, the terminal device may first detect whether there is registration window indication information sent by the network device. If the terminal device detects the window indication information, the terminal device may send the uplink registration information based on the registration window location. If the terminal device does not detect the window indication information, the terminal device may send the uplink registration window request signal on the channel that is different from the handshake toneset, and may perform uplink registration based on the registration window location indicated by the network device. The foregoing two specific implementations are described in detail below with reference to FIG. 6 and FIG. 7.

Figure 6:
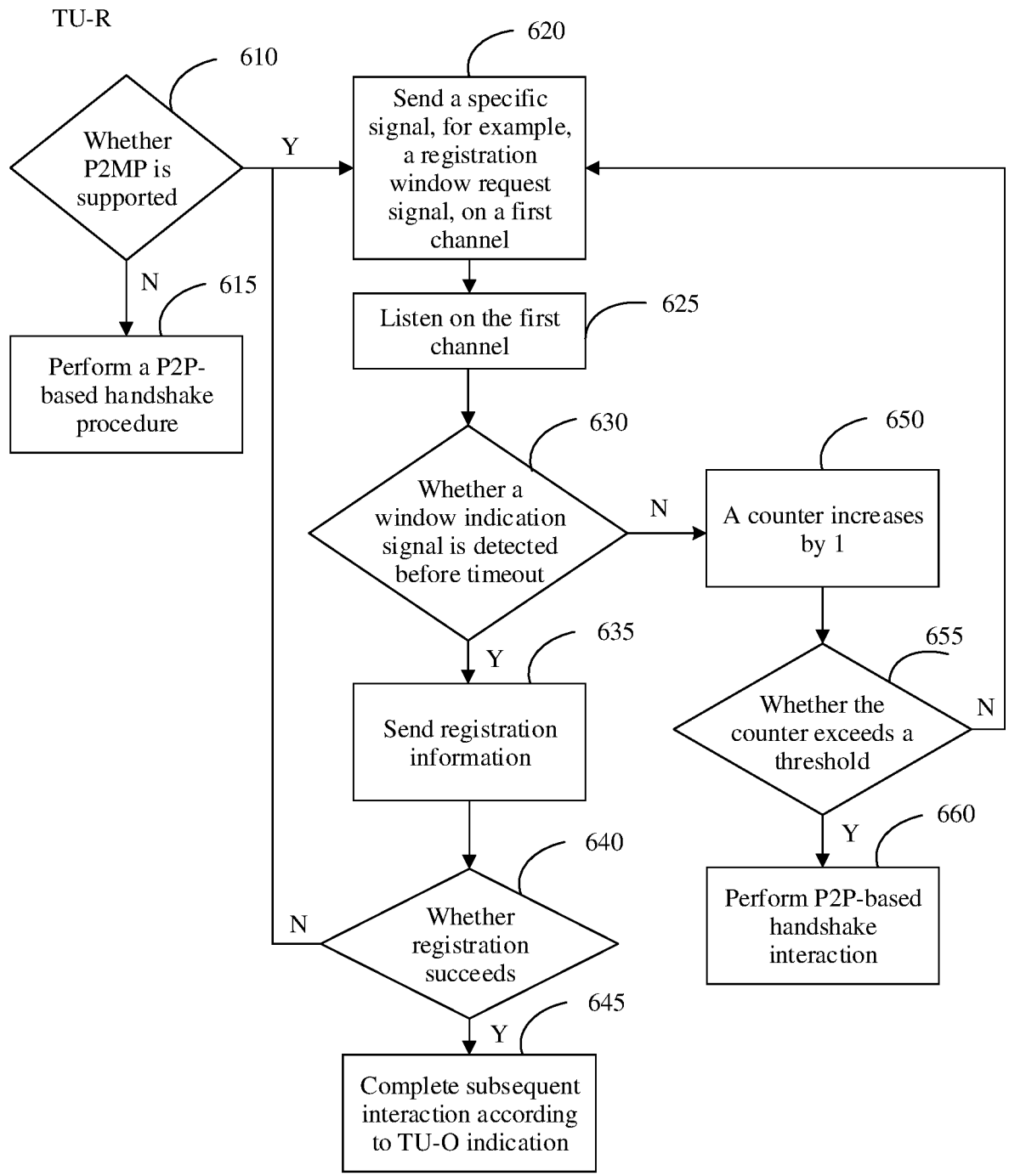
FIG. 6 is a schematic diagram of a possible working procedure of a terminal device in step 310 in FIG. 3.

Corresponding to FIG. 5, the following describes, in more detail with reference to a specific example in FIG. 6, a specific implementation in which after the terminal device in this embodiment of this application determines that the P2MP working mode may be supported, when the indication signal sent by the terminal device is another signal (for example, an uplink registration window request signal) carried on a different frequency band from the R-TONES-REQ signal in the existing handshake toneset, the terminal device may send the uplink registration window request signal on a channel that is different from the handshake toneset. It should be noted that the example in FIG. 6 is merely intended to help a person skilled in the art understand the embodiments of this application, and is not intended to limit the embodiments of this application to a specific value or a specific scenario of the example. The person skilled in the art may apparently make various equivalent modifications or changes based on the example shown in FIG. 6, and such modifications and changes also fall within the scope of the embodiments of this application.

FIG. 6 is a schematic diagram of a possible working procedure of a terminal device in step 310 in FIG. 3. A method shown in FIG. 6 may include steps 610 to 660. Steps 610 to 660 are separately described in detail below.

It should be understood that the terminal device in FIG. 6 may correspond to the TU-R 236 shown in FIG. 2. A working procedure of the TU-R is used as an example below for detailed description.

For ease of description, in this embodiment of this application, a channel different from a handshake toneset is referred to as a first channel.

Step 610: Determine whether the TU-R supports a P2MP working mode.

After the TU-R is powered on, it may be determined whether the TU-R supports the P2MP working mode. If the TU-R does not support the P2MP working mode (but supports a P2P working mode), step 615 may be performed. If the TU-R supports the P2MP working mode, step 620 may be performed.

Step 615: The TU-R enters the P2P working mode.

The TU-R may perform handshake protocol interaction based on the P2P working mode when it is determined that the P2MP working mode is not supported (but the P2P working mode is supported).

Step 620: The TU-R sends a specific signal on a first channel.

If the TU-R supports the P2MP working mode, the TU-R may send the specific signal on the first channel. For example, the specific signal may be uplink registration window request information.

Specifically, the specific signal may be a PN sequence or a ZC sequence carried in specific time domain and specific frequency domain, or may be a signal that has specific energy on a fixed frequency band at fixed time.

Step 625: The TU-R listens on the first channel.

After sending the specific signal on the first channel, the TU-R may listen on the first channel.

Step 630: Determine whether the TU-R detects an uplink registration window indication signal before timeout.

It is determined whether the TU-R detects, before timeout, an uplink registration window indication signal sent by a network device (for example, the TU-O in FIG. 5).

If the TU-R detects, before timeout, the uplink registration window indication signal sent by the TU-O, the TU-R may perform steps 635 to 645.

If the TU-R does not detect, on the first channel before timeout, the uplink registration window indication signal sent by the TU-O in FIG. 5, the TU-R may perform steps 650 to 660.

A specific implementation in which the TU-R detects, before timeout, the uplink registration window indication signal sent by the TU-O in FIG. 5 is described below with reference to steps 635 to 645.

Step 635: The TU-R sends registration information.

After detecting, before timeout, the uplink registration window indication signal sent by the TU-O in FIG. 5, the TU-R may send the registration information at an uplink registration window location specified by the TU-O in FIG. 5.

It should be understood that the registration information sent by the TU-R at the specified registration window location may include but is not limited to information such as a unique identifier ID (for example, a media access control (MAC) address) and cyclic redundancy check (CRC) of the TU-R.

Step 640: Determine whether registration of the TU-R succeeds.

After sending the registration information at the uplink registration window location specified by the TU-O in FIG. 5, the TU-R may determine whether a response message sent by the TU-O may be correctly received.

If the TU-R receives the response message sent by the TU-O, registration of the TU-R succeeds, and step 645 may be performed.

If the TU-R does not receive the response message sent by the TU-O, registration of the TU-R fails, and step 620 may be performed again.

Step 645: The TU-R performs subsequent interaction based on the TU-O to enter a data stage (e.g., show time).

After successful registration, the TU-R may obtain an ID allocated by the TU-O in FIG. 5, may enter a subsequent initialization procedure such as a handshake protocol procedure based on a mode indicated or predefined by the TU-O, and may enter the show time after initialization.

It should be understood that the show time may be understood as that the TU-O and the TU-R have completed an initialization process, and may start to send data on a bearer channel.

A specific implementation in which the TU-R does not detect, before timeout, the uplink registration window indication signal sent by the TU-O in FIG. 5 is described below with reference to steps 650 to 665.

Step 650: A counter increases by 1.

If the TU-R does not detect, on the first channel before timeout, the uplink registration window indication signal sent by the TU-O in FIG. 5, a timeout timer may increase by 1.

Step 655: Determine whether the counter exceeds a threshold.

If the TU-R does not receive, before the counter exceeds the threshold, the uplink registration window indication signal sent by the TU-O, the TU-R may perform step 620 again.

If the TU-R does not receive, after the counter exceeds the threshold, the uplink registration window indication signal sent by the TU-O, the TU-O may not support the P2MP working mode, and the TU-R may perform step 660.

Step 660: The TU-R performs P2P-based handshake interaction.

After the TU-R does not receive, after the timer exceeds the threshold, the uplink registration window indication signal sent by the TU-O, the TU-R may send a handshake signal (for example, an R-TONES-REQ signal) to the TU-O, may enter the P2P working mode, and may continue to complete a subsequent handshake protocol.

In the P2MP working mode, the terminal device provided in this embodiment of this application may be prevented from periodically indicating a registration window, thereby reducing resource overhead and power consumption on a network device side. In addition, the terminal device may be further compatible with both a device in the P2P working mode and a device in the P2MP working mode.

Figure 7:
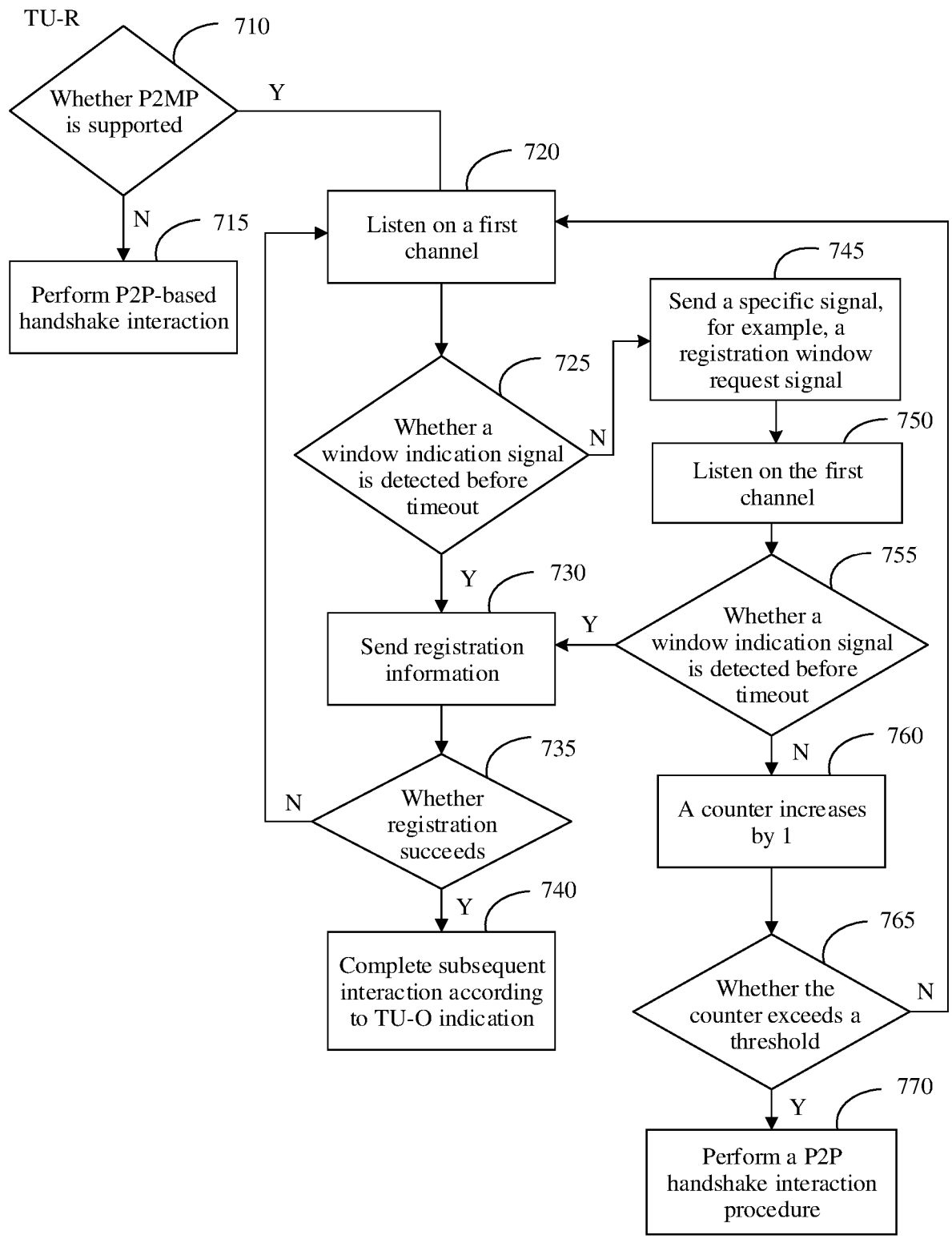
FIG. 7 is a schematic diagram of another possible working procedure of a terminal device in step 310 in FIG. 3.

Corresponding to FIG. 5, the following describes, in more detail with reference to a specific example in FIG. 7, a specific implementation in which the terminal device in this embodiment of this application may first detect whether there is registration window indication information sent by the network device, and if the window indication information is not detected, the terminal device sends first indication information on a channel different from a handshake toneset. It should be noted that the example in FIG. 7 is merely intended to help a person skilled in the art understand the embodiments of this application, and is not intended to limit the embodiments of this application to a specific value or a specific scenario of the example. The person skilled in the art may apparently make various equivalent modifications or changes based on the example shown in FIG. 7, and such modifications and changes also fall within the scope of the embodiments of this application.

FIG. 7 is a schematic diagram of another possible working procedure of a terminal device in step 310 in FIG. 3. A method shown in FIG. 7 may include steps 710 to 770. Steps 710 to 770 are separately described in detail below.

It should be understood that the terminal device in FIG. 7 may correspond to the TU-R 236 shown in FIG. 2. A working procedure of the TU-R is used as an example below for detailed description.

For ease of description, in this embodiment of this application, a channel different from a handshake toneset is referred to as a first channel.

Step 710: Determine whether the TU-R supports a P2MP working mode.

After the TU-R is powered on, it may be determined whether the TU-R supports the P2MP working mode. If the TU-R does not support the P2MP working mode (but supports a P2P working mode), step 715 may be performed.

If the TU-R supports the P2MP working mode, step 720 may be performed.

Step 715: The TU-R enters the P2P working mode.

The TU-R may perform handshake protocol interaction based on the P2P working mode when it is determined that the P2MP working mode is not supported (but the P2P working mode is supported).

Step 720: The TU-R listens on a first channel.

The TU-R may first listen on the first channel when it is determined that the P2MP working mode is supported.

Step 725: Determine whether the TU-R detects an uplink registration window indication signal before timeout.

It is determined whether the TU-R detects, on the first channel before timeout, an uplink registration window indication signal sent by a network device (for example, the TU-O in FIG. 5).

If the TU-R detects, on the first channel before timeout, the uplink registration window indication signal sent by the TU-O, the TU-R may perform steps 735 and 740.

If the TU-R does not detect, on the first channel before timeout, the uplink registration window indication signal sent by the TU-O in FIG. 5, the TU-R may perform steps 745 and 750.

Step 730: The TU-R sends registration information.

After detecting, before timeout, the uplink registration window indication signal sent by the TU-O in FIG. 5, the TU-R may send the registration information at an uplink registration window location specified by the TU-O in FIG. 5.

It should be understood that the registration information sent by the TU-R at the specified registration window location may include but is not limited to information such as a unique identifier ID (for example, a MAC address) and cyclic redundancy check CRC of the TU-R.

Step 735: Determine whether registration of the TU-R succeeds.

After sending the registration information at the uplink registration window location specified by the TU-O in FIG. 5, the TU-R may determine whether a response message sent by the TU-O may be correctly received.

If the TU-R receives the response message sent by the TU-O, registration of the TU-R succeeds, and step 745 may be performed.

If the TU-R does not receive the response message sent by the TU-O, registration of the TU-R fails, and step 720 may be performed again.

Step 740: The TU-R performs subsequent interaction based on the TU-O to enter show time.

After successful registration, the TU-R may obtain an ID allocated by the TU-O in FIG. 5, may enter a subsequent initialization procedure such as a handshake protocol procedure based on a mode indicated or predefined by the TU-O, and may enter the show time after initialization.

It should be understood that the show time may be understood as that the TU-O and the TU-R have completed an initialization process, and may start to send data on a bearer channel.

Step 745: The TU-R sends a specific signal on the first channel.

If the TU-R supports the P2MP working mode, and the TU-R does not detect, before timeout, the uplink registration window indication signal sent by the TU-O, the TU-R may send the specific signal on the first channel. For example, the specific signal may be uplink registration window request information.

Specifically, the specific signal may be a PN sequence or a ZC sequence carried in specific time domain and specific frequency domain, or may be a signal that has specific energy on a fixed frequency band at fixed time.

Step 750: The TU-R listens on the first channel.

After sending the specific signal on the first channel, the TU-R may listen on the first channel.

Step 755: Determine whether the TU-R detects the uplink registration window indication signal before timeout.

It is determined whether the TU-R detects, on the first channel before timeout, an uplink registration window indication signal sent by a network device (for example, the TU-O in FIG. 5).

If the TU-R detects, on the first channel before timeout, the uplink registration window indication signal sent by the TU-O, the TU-R may perform steps 730 and 735.

If the TU-R does not detect, on the first channel before timeout, the uplink registration window indication signal sent by the TU-O in FIG. 5, the TU-R may perform steps 760 and 765.

For a specific implementation in which the TU-R detects, before timeout, the uplink registration window indication signal sent by the TU-O in FIG. 5, refer to the foregoing descriptions of steps 730 and 735.

A specific implementation in which the TU-R does not detect, before timeout, the uplink registration window indication signal sent by the TU-O in FIG. 5 is described below with reference to steps 760 to 770.

Step 760: A counter increases by 1.

If the TU-R does not detect, on the first channel before timeout, the uplink registration window indication signal sent by the TU-O in FIG. 5, a timeout timer may increase by 1.

Step 765: Determine whether the counter exceeds a threshold.

If the TU-R does not receive, before the counter exceeds the threshold, the uplink registration window indication signal sent by the TU-O, the TU-R may perform step 720 again.

If the TU-R does not receive, after the counter exceeds the threshold, the uplink registration window indication signal sent by the TU-O, the TU-O may not support the P2MP working mode, and the TU-R may perform step 770.

Step 770: The TU-R performs P2P-based handshake interaction.

After the TU-R does not receive, after the timer exceeds the threshold, the uplink registration window indication signal sent by the TU-O, the TU-R may send a handshake signal (for example, an R-TONES-REQ signal) to the TU-O, may enter the P2P working mode, and may continue to complete a subsequent handshake protocol.

Based on FIG. 6, the terminal device provided in FIG. 7 may first detect whether there is registration window indication information sent by the network device. If the window indication information is detected, a new user may directly go online to perform registration, so that a random access registration process of the new user may be simplified.

In the P2MP working mode, the terminal device provided in this embodiment of this application may be prevented from periodically indicating a registration window, thereby reducing resource overhead and power consumption on a network device side. In addition, the terminal device may be further compatible with both a device in the P2P working mode and a device in the P2MP working mode.

Optionally, in some embodiments, when the indication signal may be a signal (for example, an R-TONES-REQ signal) that carried on the same frequency band and in the same form as an existing handshake toneset signal R-TONES-REQ, or a signal (for example, a registration window request signal) carried on the same frequency band as the R-TONES-REQ signal but in a different form from the R-TONES-REQ signal, the network device may further receive, in a handshake toneset of a first port, an R-TONES-REQ signal or a registration window request signal sent by the terminal device. The foregoing two implementations are described below with reference to FIG. 8 and FIG. 11.

Figure 8:
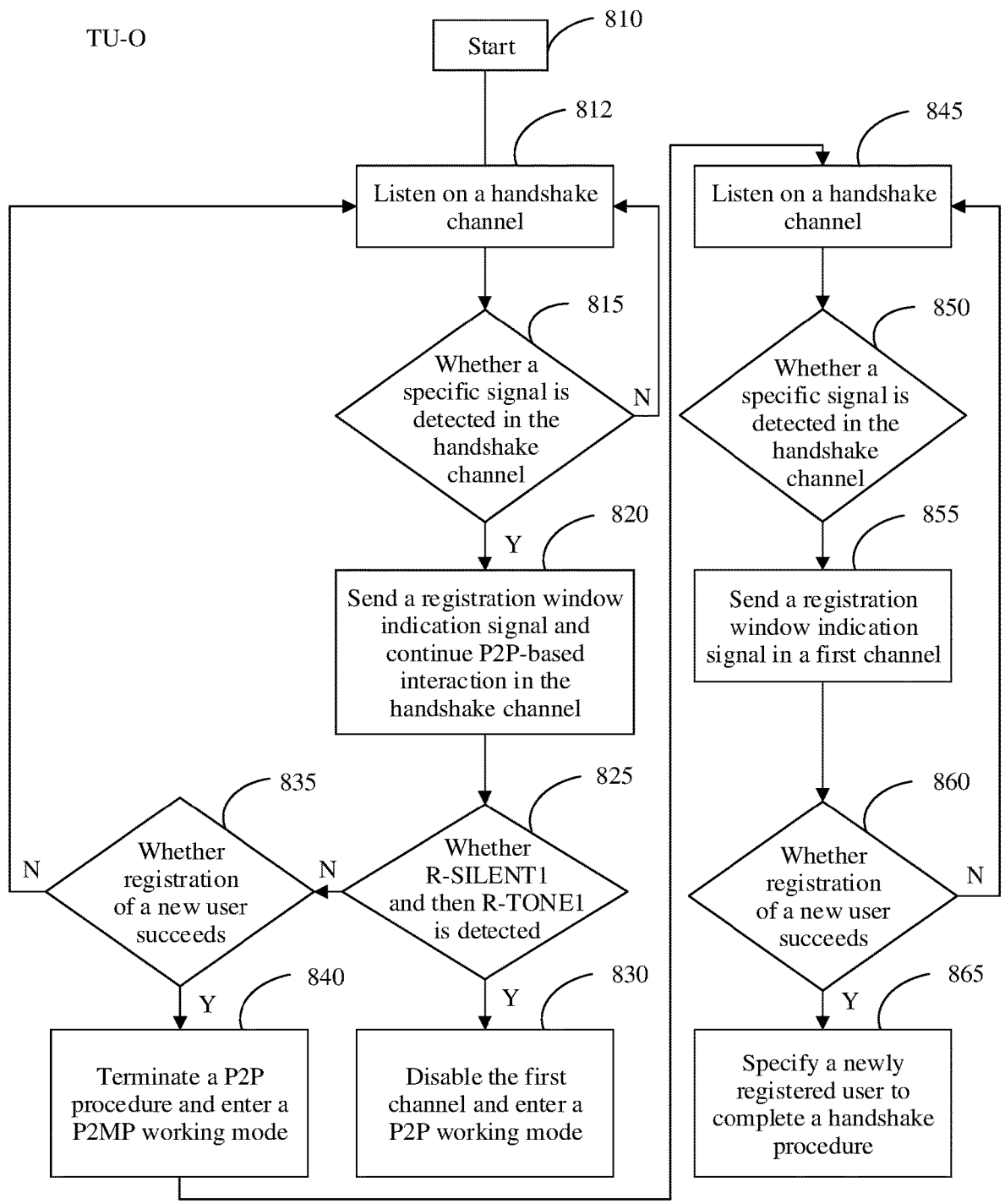
FIG. 8 is a schematic diagram of another possible working procedure of a network device in step 310 in FIG. 3.

The following describes, in more detail with reference to a specific example in FIG. 8, a specific implementation in which the network device in this embodiment of this application may receive, in the handshake toneset of the first port, the R-TONES-REQ signal sent by the terminal device. It should be noted that the example in FIG. 8 is merely intended to help a person skilled in the art understand the embodiments of this application, and is not intended to limit the embodiments of this application to a specific value or a specific scenario of the example. The person skilled in the art may apparently make various equivalent modifications or changes based on the example shown in FIG. 8, and such modifications and changes also fall within the scope of the embodiments of this application.

FIG. 8 is a schematic diagram of another possible working procedure of a network device in step 310 in FIG. 3. A method shown in FIG. 8 may include steps 810 to 865. Steps 810 to 865 are separately described in detail below.

It should be understood that the network device in FIG. 8 may correspond to the TU-O 234 shown in FIG. 2. A working procedure of the TU-O is used as an example for detailed description.

For ease of description, in this embodiment of this application, a channel different from a handshake toneset is referred to as a first channel.

Step 810: Start to power on.

Step 812: The TU-O detects a handshake toneset.

After being powered on, the TU-O may listen to a handshake toneset (which may also be referred to as a P2P channel) of a port.

Step 815: Determine whether the TU-O detects a specific signal in the handshake toneset.

If the TU-O detects the specific signal in the handshake toneset, the TU-O may perform step 820.

If the TU-O does not detect the specific signal in the handshake toneset, the TU-O may perform step 810 again.

It should be understood that a form of the specific signal detected in the handshake toneset may be, for example, an R-TONES-REQ signal.

In this embodiment of this application, the R-TONES-REQ signal in the handshake toneset may be a signal used to indicate that a TU-R triggers the TU-O to send an uplink registration window request (the TU-O is triggered to enter a P2MP working mode), or may be a signal used to indicate that the TU-R triggers the TU-O to enter a P2P working mode. This is not specifically limited in this application.

Step 820: The TU-O sends an uplink registration window indication signal, and performs P2P-based interaction on a handshake channel based on a protocol.

In this embodiment of this application, after detecting the specific signal in the handshake toneset, the TU-O may send the uplink registration window indication signal on a first channel, and may send the uplink registration window indication signal in the handshake toneset.

This is not specifically limited in this embodiment of this application.

After sending the uplink registration window indication signal, the TU-O may simultaneously perform P2P-based interaction in the handshake toneset based on the protocol.

It should be understood that the TU-O may be compatible with both a P2MP device and a P2P device. The TU-R may select the P2MP working mode or the P2P working mode.

Optionally, in some embodiments, before sending the uplink registration window indication signal, the TU-O may further send a training sequence, and the training sequence may be used for synchronization and training of a downlink channel of a terminal device (for example, the TU-R).

Step 825: Determine whether the TU-O receives R-SILENT1, and then detect an R-TONE1 signal.

If the TU-O first receives, in the handshake toneset, the R-SILENT1 signal sent by the TU-R, and then receive the R-TONE1 signal sent by the TU-R (indicating that the TU-R may support only the P2P working mode), the TU-O may perform step 830. The TU-O may enter the P2P working mode, and may choose to perform subsequent handshake interaction based on a handshake channel procedure.

If the TU-O does not receive, in the handshake toneset, the R-SILENT1 signal and the R-TONE1 signal sent by the TU-R, the TU-O may perform step 835. The TU-O may detect, at an indicated uplink registration window location, whether there is uplink registration information sent by the TU-R.

Step 830: The TU-O disables the first channel and enters the P2P working mode.

After receiving, in the handshake toneset, the R-TONE1 signal sent by the TU-R, the TU-O may disable the first channel and enter the P2P working mode, and may continue to complete a subsequent handshake protocol.

It should be noted that if the TU-O later works in the P2P working mode, the TU-O no longer supports the P2MP working mode.

Step 835: Determine whether registration of a new user succeeds.

If the TU-O does not receive, in the handshake toneset, the R-TONE1 signal sent by the TU-R, the TU-O may detect, at the indicated uplink registration window location, whether there is the uplink registration information sent by the TU-R.

If the TU-O detects, in an indicated registration window, the uplink registration information sent by the TU-R, and responds to correctly parsed uplink registration information, the TU-O may complete registration of the new user. The TU-O may perform step 840 and work in the P2MP working mode.

If the TU-O does not detect, in the indicated registration window, the uplink registration information sent by the TU-R, the TU-O may perform step 810 again, and may listen on the handshake toneset again.

Step 840: End a handshake procedure and enter the P2MP working mode.

If the TU-O detects, in the indicated registration window, the uplink registration information sent by the TU-R, and responds to the correctly parsed uplink registration information, the TU-O may complete registration of the new user. The TU-O may end the handshake procedure and enter the P2MP working mode.

After entering the P2MP working mode, the TU-O may allocate an ID to a successfully registered TU-R. The TU-O may specify that the TU-R enters a subsequent initialization procedure, such as a handshake protocol procedure.

It should be noted that if the TU-O already works in the P2MP working mode, the TU-O may subsequently perform steps 845 to 865, and may send the uplink registration window indication signal only on the first channel after detecting the specific signal in the handshake toneset.

Step 845: The TU-O detects the handshake toneset.

The TU-O may listen on a handshake toneset of a port.

Step 850: Determine whether the TU-O detects the specific signal in the handshake toneset.

If the TU-O detects the signal of the specific form in the handshake toneset (the signal of the specific form may be, for example, an R-TONES-REQ signal), the TU-O may perform step 855.

If the TU-O does not detect the specific signal in the handshake toneset, the TU-O may perform step 845 again.

Step 855: The TU-O sends the uplink registration window indication signal on the first channel.

After entering the P2MP working mode, if the TU-O detects the specific signal in the handshake toneset, the TU-O sends the uplink registration window indication signal only on the first channel, and does not respond to a non-specified handshake signal.

Step 860: Determine whether registration of the new user succeeds.

If the TU-O detects, in the indicated registration window, the uplink registration information sent by the TU-R, and responds to the correctly parsed uplink registration information, the TU-O may complete registration of the new user, and may perform step 865.

If the TU-O does not detect, in the indicated registration window, the uplink registration information sent by the TU-R, the TU-O may perform step 845 again, and listen on the handshake toneset again.

Step 865: The TU-O specifies that a newly registered user completes the handshake procedure, and detects the first channel.

After entering the P2MP working mode, the TU-O may allocate an ID to a successfully registered TU-R. The TU-O may specify that the TU-R enters a subsequent initialization procedure, such as a handshake protocol procedure.

In the P2MP working mode, the network device provided in this embodiment of this application may be prevented from periodically indicating a registration window, thereby reducing resource overhead and power consumption. In addition, the network device may be further compatible with both a device in the P2P working mode and a device in the P2MP working mode.

Corresponding to an implementation in which the network device shown in FIG. 8 receives, in the handshake toneset of the first port, the R-TONES-REQ signal sent by the terminal device (for example, the TU-R), in this embodiment of this application, there are also two implementations in which the terminal device sends the R-TONES-REQ signal. For example, after determining that the terminal device may support the P2MP working mode, the terminal device may directly send the R-TONES-REQ signal in the handshake toneset. For another example, the terminal device may first detect whether there is registration window indication information sent by the network device; and if there is no registration window indication information, the terminal device sends the R-TONES-REQ signal in the handshake toneset.

Figure 9:
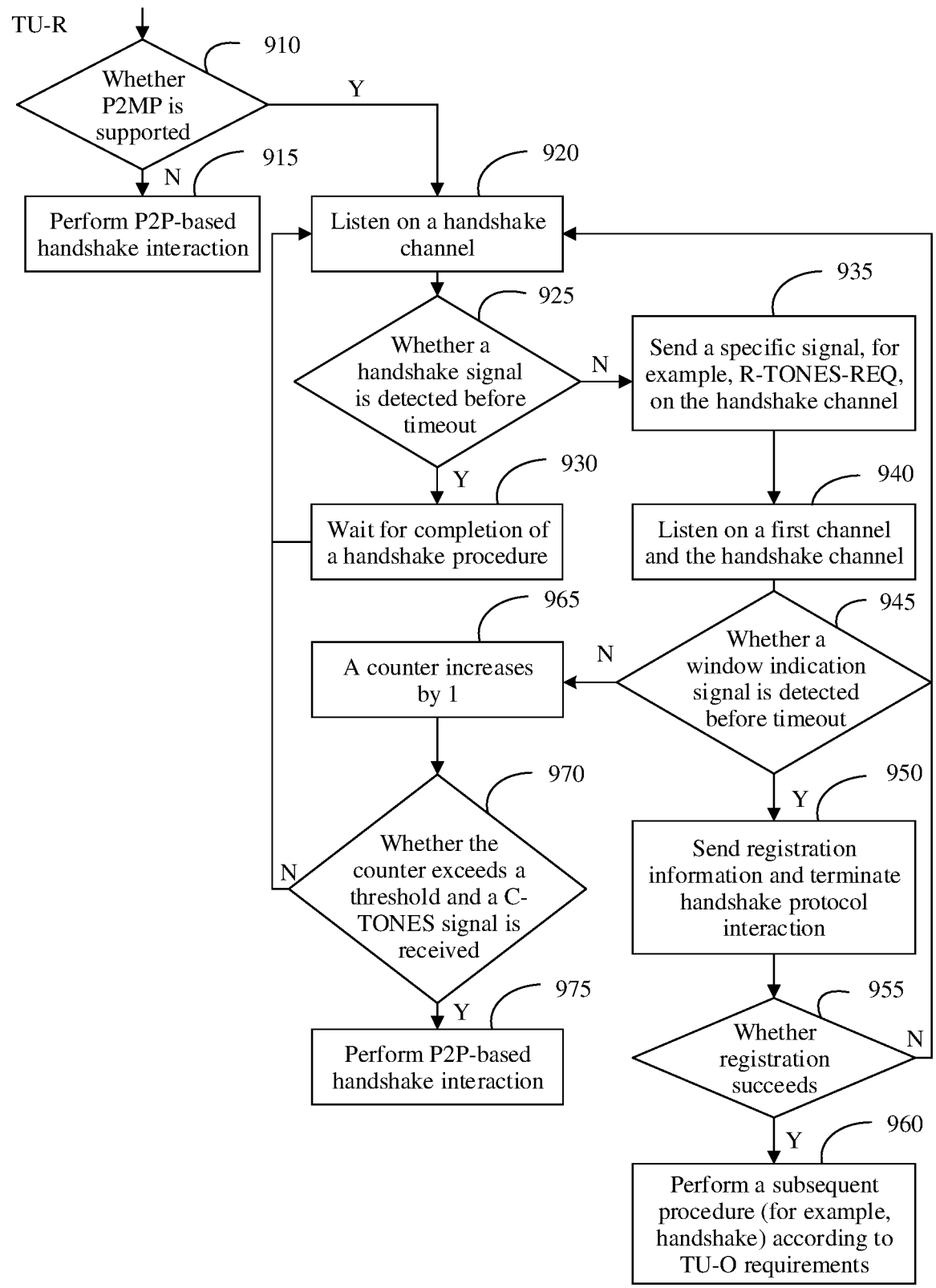
FIG. 9 is a schematic diagram of another possible working procedure of a terminal device in step 310 in FIG. 3.

Corresponding to FIG. 8, the following describes, in more detail with reference to a specific example in FIG. 9, a specific implementation in which the terminal device in this embodiment of this application may send first indication information in the handshake toneset after determining that the terminal device may support the P2MP working mode. It should be noted that the example in FIG. 9 is merely intended to help a person skilled in the art understand the embodiments of this application, and is not intended to limit the embodiments of this application to a specific value or a specific scenario of the example. The person skilled in the art may apparently make various equivalent modifications or changes based on the example shown in FIG. 9, and such modifications and changes also fall within the scope of the embodiments of this application.

FIG. 9 is a schematic diagram of another possible working procedure of a terminal device in step 310 in FIG. 3. A method shown in FIG. 9 may include steps 910 to 975. Steps 910 to 975 are separately described in detail below.

It should be understood that the terminal device in FIG. 9 may correspond to the TU-R 236 shown in FIG. 2. A working procedure of the TU-R is used as an example below for detailed description.

For ease of description, in this embodiment of this application, a channel different from a handshake toneset is referred to as a first channel.

Step 910: Determine whether the TU-R supports a P2MP working mode.

After the TU-R is powered on, it may be determined whether the TU-R supports the P2MP working mode. If the TU-R does not support the P2MP working mode (but supports a P2P working mode), step 915 may be performed. If the TU-R supports the P2MP working mode, step 920 may be performed.

Step 915: The TU-R enters the P2P working mode.

The TU-R may perform handshake protocol interaction based on the P2P working mode when it is determined that the P2MP working mode is not supported (but the P2P working mode is supported).

Step 920: The TU-R listens on a downlink handshake toneset.

When determining that the P2MP working mode is supported, the TU-R may first listen on the handshake toneset to detect whether there is another handshake protocol signal that is being interacted in the handshake toneset.

It should be understood that if the TU-R supports the P2MP working mode and desires to send a signal of a specific form on a handshake channel, the TU-R may first detect whether there is another handshake protocol signal that is being interacted in the handshake toneset. If there is the handshake protocol signal that is being interacted in the handshake toneset, the signal of the specific form may be sent in the handshake toneset after a handshake procedure is completed, thereby avoiding signal interference.

Step 925: Determine whether the TU-R detects a handshake signal before timeout.

If the TU-R detects, before timeout, the handshake protocol signal that is being interacted in the handshake toneset, the TU-R may perform step 930.

If the TU-R does not detect, before timeout, the handshake protocol signal that is being interacted in the handshake toneset, the TU-R may perform step 935.

Step 930: Wait for completion of the handshake procedure.

When determining that there is the handshake protocol signal that is being interacted in the handshake toneset, the TU-R may wait for completion of the handshake procedure and then send the signal of the specific form in the handshake toneset, thereby avoiding signal interference.

After the handshake procedure is completed, the TU-R may continue to perform step 940. The TU-R listens on the handshake toneset, and determines whether there is, before timeout, another handshake protocol signal that is being interacted in the handshake toneset.

Step 935: The TU-R sends a specific signal in the handshake toneset.

When the TU-R does not detect, before timeout, the handshake protocol signal that is being interacted in the handshake toneset, the TU-R may send an uplink registration information request signal in the handshake toneset.

It should be understood that the uplink registration information request signal sent by the TU-R in the handshake toneset may be an R-TONES-REQ signal on a handshake channel, or may be another signal, for example, an energy signal carried within specific time or a frequency band or a differentially encoded binary phase shift keying (differentially encoded binary phase shift keying, DPSK) modulation sequence.

In this embodiment of this application, the R-TONES-REQ signal in the handshake toneset may be a signal used to indicate that the TU-O is triggered to send an uplink registration window request (e.g., the TU-O is triggered to enter the P2MP working mode), or may be a signal used to indicate that the TU-O is triggered to enter the P2P working mode. This is not specifically limited in this application.

Step 940: The TU-R listens on a first channel and the handshake toneset.

After sending the signal of the specific form on the handshake channel, the TU-R may listen on the first channel and the handshake toneset.

Step 945: Determine whether the TU-R detects an uplink registration window indication signal before timeout.

If the TU-R detects, before timeout, the uplink registration window indication signal sent by a network device (for example, the TU-O in FIG. 8), it may be understood as that the TU-O may also support the P2MP working mode, and the TU-R may perform steps 950 and 955.

In this embodiment of this application, after the TU-R may detect the uplink registration window indication signal in the handshake toneset, and may further send the uplink registration window indication signal on the first channel. This is not specifically limited in this embodiment of this application.

If the TU-R does not detect the uplink registration window indication signal before timeout, it may be understood as that the TU-O does not support the P2MP working mode (but supports the P2P working mode), and the TU-R may perform steps 965 to 975.

Step 950: The TU-R sends a registration message and terminates handshake protocol interaction.

After detecting, before timeout, the uplink registration window indication signal sent by the TU-O in FIG. 8, the TU-R may send registration information at an uplink registration window location specified by the TU-O in FIG. 8. In addition, the TU-R may terminate the handshake interaction.

It should be understood that the registration information sent by the TU-R at the specified registration window location may include but is not limited to information such as a unique identifier ID (for example, a MAC address) and CRC of the TU-R.

Step 955: Determine whether registration of the TU-R succeeds.

After sending the registration information at the uplink registration window location specified by the TU-O in FIG. 8, the TU-R may determine whether a response message sent by the TU-O may be correctly received.

If the TU-R receives the response message sent by the TU-O, registration of the TU-R succeeds, and step 960 may be performed.

If the TU-R does not receive the response message sent by the TU-O, registration of the TU-R fails, and step 920 may be performed again.

Step 960: The TU-R performs subsequent interaction based on the TU-O to enter show time.

After successful registration, the TU-R may obtain an ID allocated by the TU-O in FIG. 8, may enter a subsequent initialization procedure such as a handshake protocol procedure based on a mode indicated or predefined by the TU-O, and may enter the show time after initialization.

It should be understood that the show time may be understood as that the TU-O and the TU-R have completed an initialization process, and may start to send data on a bearer channel.

A specific implementation in which the TU-R does not detect, before timeout, the uplink registration window indication signal sent by the TU-O in FIG. 8 is described below with reference to steps 965 to 975.

Step 965: A counter increases by 1.

If the TU-R does not detect, before timeout, the uplink registration window indication signal sent by the TU-O in FIG. 8, a timeout timer may increase by 1.

Step 970: Determine whether the counter exceeds a threshold.

If the TU-R does not receive, before the counter exceeds the threshold, the uplink registration window indication signal sent by the TU-O, the TU-R may perform step 920 again.

If the TU-R does not receive, after the counter exceeds the threshold, the uplink registration window indication signal sent by the TU-O, and receives a response signal (for example, a C-TONES signal) of a subsequent handshake signal, the TU-O may not support the P2MP working mode, and the TU-R may perform step 975.

Step 975: The TU-R performs P2P-based handshake interaction.

After the TU-R does not receive, after the timer exceeds the threshold, the uplink registration window indication signal sent by the TU-O, the TU-R may send a handshake signal (for example, an R-TONES-REQ signal) to the TU-O, may enter the P2P working mode, and may continue to complete a subsequent handshake protocol.

Figure 10A:
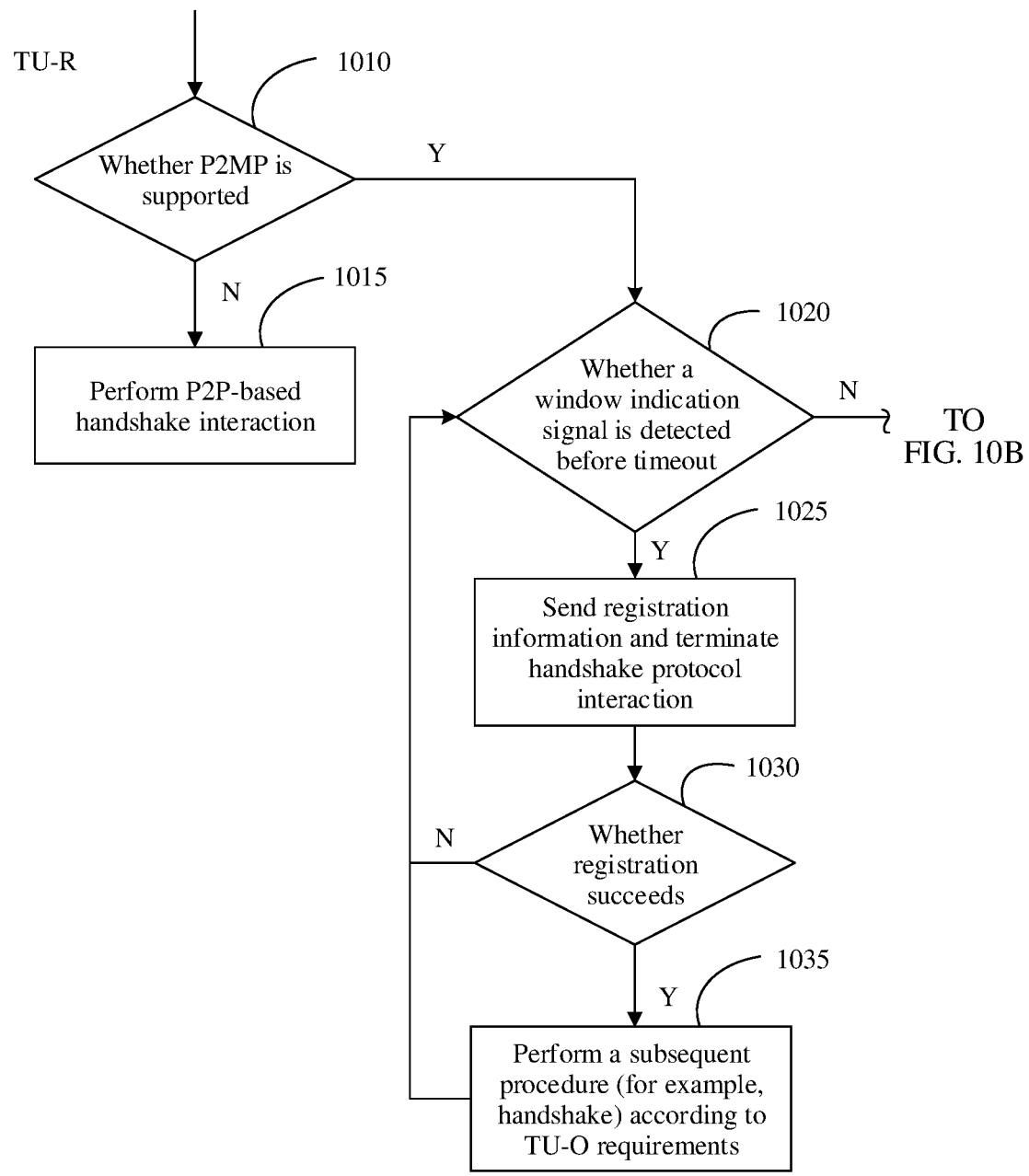
FIG. 10A and FIG. 10B are schematic diagrams of another possible working procedure of a terminal device in step 310 in FIG. 3.
Figure 10B:
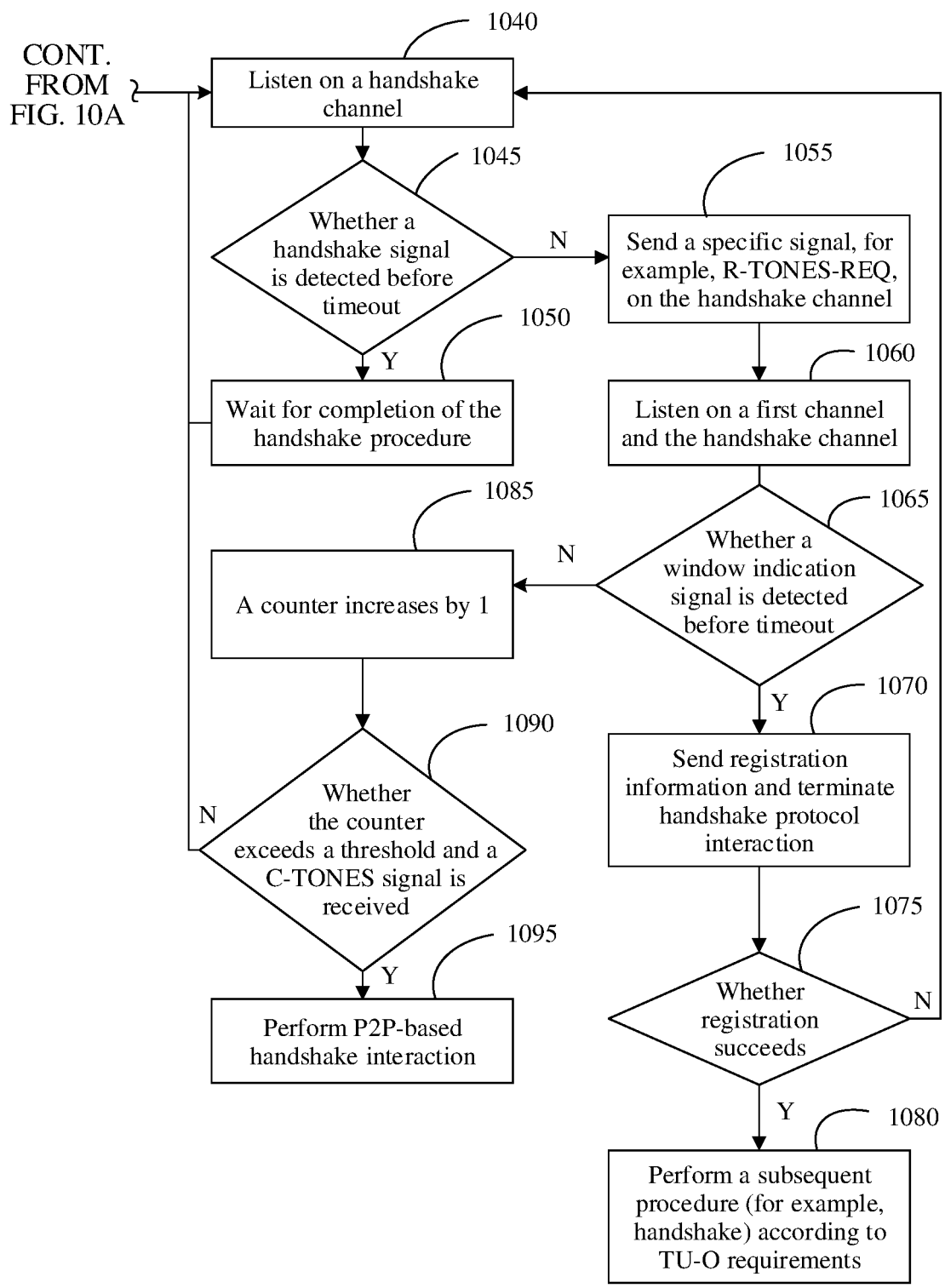

Corresponding to FIG. 8, the following describes, in more detail with reference to a specific example in FIG. 10A and FIG. 10B, a specific implementation in which the terminal device in this embodiment of this application may first detect whether there is registration window indication information sent by the network device, and if the window indication information is not detected, the terminal device sends an R-TONES-REQ signal in a handshake toneset. It should be noted that the example in FIG. 10A and FIG. 10B is merely intended to help a person skilled in the art understand the embodiments of this application, and is not intended to limit the embodiments of this application to a specific value or a specific scenario of the example. The person skilled in the art may apparently make various equivalent modifications or changes based on the example shown in FIG. 10A and FIG. 10B, and such modifications and changes also fall within the scope of the embodiments of this application.

FIG. 10A and FIG. 10B are schematic diagrams of another possible working procedure of a terminal device in step 310 in FIG. 3. A method shown in FIG. 10A and FIG. 10B may include steps 1010 to 1095. Steps 1010 to 1095 are separately described in detail below.

It should be understood that the terminal device in FIG. 10A and FIG. 10B may correspond to the TU-R 254 shown in FIG. 2. A working procedure of the TU-R is used as an example below for detailed description.

For ease of description, in this embodiment of this application, a channel different from a handshake toneset is referred to as a first channel.

Step 1010: Determine whether the TU-R supports a P2MP working mode.

After the TU-R is powered on, it may be determined whether the TU-R supports the P2MP working mode. If the TU-R does not support the P2MP working mode (but supports a P2P working mode), step 1015 may be performed. If the TU-R supports the P2MP working mode, step 1020 may be performed.

Step 1015: The TU-R enters the P2P working mode.

The TU-R may perform handshake protocol interaction based on the P2P working mode when it is determined that the P2MP working mode is not supported (but the P2P working mode is supported).

Step 1020: Determine whether the TU-R detects an uplink registration window indication signal before timeout.

If the TU-R detects, before timeout, the uplink registration window indication signal sent by a network device (for example, the TU-O in FIG. 8), it may be understood as that the TU-O may also support the P2MP working mode, and the TU-R may perform steps 1025 and 1030.

If the TU-R does not detect the uplink registration window indication signal before timeout, it may be understood as that the TU-O does not support the P2MP working mode (but supports the P2P working mode), and the TU-R may perform steps 1040 and 1045.

Step 1025: The TU-R sends a registration message and terminates handshake interaction.

After detecting, before timeout, the uplink registration window indication signal sent by the TU-O in FIG. 8, the TU-R may send registration information at an uplink registration window location specified by the TU-O in FIG. 8. In addition, the TU-R may terminate the handshake interaction.

It should be understood that the registration information sent by the TU-R at the specified registration window location may include but is not limited to information such as a unique identifier ID (for example, a MAC address) and CRC of the TU-R.

Step 1030: Determine whether registration of the TU-R succeeds.

After sending the registration information at the uplink registration window location specified by the TU-O in FIG.

8, the TU-R may determine whether a response message sent by the TU-O may be correctly received.

If the TU-R receives the response message sent by the TU-O, registration of the TU-R succeeds, and step 1035 may be performed.

If the TU-R does not receive the response message sent by the TU-O, registration of the TU-R fails, and step 1020 may be performed again.

Step 1035: The TU-R performs subsequent interaction based on the TU-O to enter show time.

After successful registration, the TU-R may obtain an ID allocated by the TU-O in FIG. 8, may enter a subsequent initialization procedure such as a handshake protocol procedure based on a mode indicated or predefined by the TU-O, and may enter the show time after initialization.

It should be understood that the show time may be understood as that the TU-O and the TU-R have completed an initialization process, and may start to send data on a bearer channel.

Step 1040: The TU-R listens on a downlink handshake toneset.

When determining that the P2MP working mode is supported, the TU-R may first listen on a handshake channel to detect whether there is another handshake protocol signal that is being interacted on the handshake channel.

It should be understood that if the TU-R supports the P2MP working mode and desires to send a signal of a specific form on the handshake channel, the TU-R may first detect whether there is another handshake protocol signal that is being interacted on the handshake channel. If there is the handshake protocol signal that is being interacted on the handshake channel, the signal of the specific form may be sent on the handshake channel after a handshake procedure is completed, thereby avoiding signal interference.

Step 1045: Determine whether the TU-R detects a handshake protocol signal before timeout.

If the TU-R detects, before timeout, the handshake protocol signal that is being interacted on the handshake channel, the TU-R may perform step 1050.

If the TU-R does not detect, before timeout, the handshake protocol signal that is being interacted on the handshake channel, the TU-R may perform step 1055.

Step 1050: Wait for completion of the handshake procedure.

When determining that there is the handshake protocol signal that is being interacted on the handshake channel, the TU-R may wait for completion of the handshake procedure and then send the signal of the specific form on the handshake channel, thereby avoiding signal interference.

After the handshake procedure is completed, the TU-R may continue to perform step 1040. The TU-R listens on a downlink handshake channel, and determines whether there is, before timeout, another handshake protocol signal that is being interacted on the handshake channel.

Step 1055: The TU-R sends a specific signal on a handshake toneset channel.

When the TU-R does not detect, before timeout, the handshake protocol signal that is being interacted on the handshake channel, the TU-R may send an uplink registration information request signal on the handshake channel.

It should be understood that the uplink registration information request signal sent by the TU-R on the handshake channel may be an R-TONES-REQ signal on the handshake channel, or may be another signal, for example, an energy signal carried within specific time or a frequency band or a differentially encoded binary phase shift keying (differentially encoded binary phase shift keying, DPSK) modulation sequence.

Step 1060: The TU-R listens on a first channel and the handshake toneset.

After sending the signal of the specific form on the handshake channel, the TU-R may detect the first channel and the handshake toneset.

Step 1065: Determine whether the TU-R detects an uplink registration window indication signal before timeout.

If the TU-R detects, on the first channel before timeout, the uplink registration window indication signal sent by the network device (for example, the TU-O in FIG. 8), it may be understood as that the TU-O may also support the P2MP working mode, and the TU-R may perform steps 1070 and 1075.

If the TU-R does not detect the uplink registration window indication signal on the first channel before timeout, it may be understood as that the TU-O does not support the P2MP working mode (but supports the P2P working mode), and the TU-R may perform steps 1085 to 10105.

Step 1070: The TU-R sends a registration message and terminates handshake interaction.

After detecting, before timeout, the uplink registration window indication signal sent by the TU-O in FIG. 8, the TU-R may send the registration information at the uplink registration window location specified by the TU-O in FIG. 8. In addition, the TU-R may terminate the handshake interaction.

It should be understood that the registration information sent by the TU-R at the specified registration window location may include but is not limited to information such as a unique identifier ID (for example, a MAC address) and CRC of the TU-R.

Step 1075: Determine whether registration of the TU-R succeeds.

After sending the registration information at the uplink registration window location specified by the TU-O in FIG. 8, the TU-R may determine whether a response message sent by the TU-O may be correctly received.

If the TU-R receives the response message sent by the TU-O, registration of the TU-R succeeds, and step 1080 may be performed.

If the TU-R does not receive the response message sent by the TU-O, registration of the TU-R fails, and step 1040 may be performed again.

Step 1080: The TU-R performs subsequent interaction based on the TU-O to enter show time.

After successful registration, the TU-R may obtain an ID allocated by the TU-O in FIG. 8, may enter a subsequent initialization procedure such as a handshake protocol procedure based on a mode indicated or predefined by the TU-O, and may enter the show time after initialization.

Step 1085: A counter increases by 1.

If the TU-R does not detect, before timeout, the uplink registration window indication signal sent by the TU-O in FIG. 8, a timeout timer may increase by 1.

Step 1090: Determine whether the counter exceeds a threshold.

If the TU-R does not receive, before the counter exceeds the threshold, the uplink registration window indication signal sent by the TU-O, the TU-R may perform step 1040 again.

If the TU-R does not receive, after the counter exceeds the threshold, the uplink registration window indication signal sent by the TU-O, and receives a response signal (for example, a C-TONES signal) of a subsequent handshake signal, the TU-O may not support the P2MP working mode, and the TU-R may perform step 1095.

Step 1095: The TU-R performs P2P-based handshake interaction.

After the TU-R does not receive, after the timer exceeds the threshold, the uplink registration window indication signal sent by the TU-O, the TU-R may send a handshake signal (for example, an R-TONES-REQ signal) to the TU-O, may enter the P2P working mode, and continue to complete a subsequent handshake protocol.

Based on FIG. 9, the terminal device provided in FIG. 10A and FIG. 10B may first detect whether there is registration window indication information sent by the network device. If the window indication information is detected, a new user may directly go online to perform registration, so that a random access registration process of the new user may be simplified.

Optionally, in some embodiments, when the indication signal may be alternatively a signal (for example, an uplink registration window request signal) carried on the same frequency band as the R-TONES-REQ signal in the existing handshake toneset, but in a different form from the R-TONES-REQ signal, the network device may alternatively receive, in a handshake toneset of a first port, an uplink registration window request signal sent by the terminal device. The uplink registration window request signal may be used to indicate that the terminal device enters the P2MP working mode.

Figure 11:
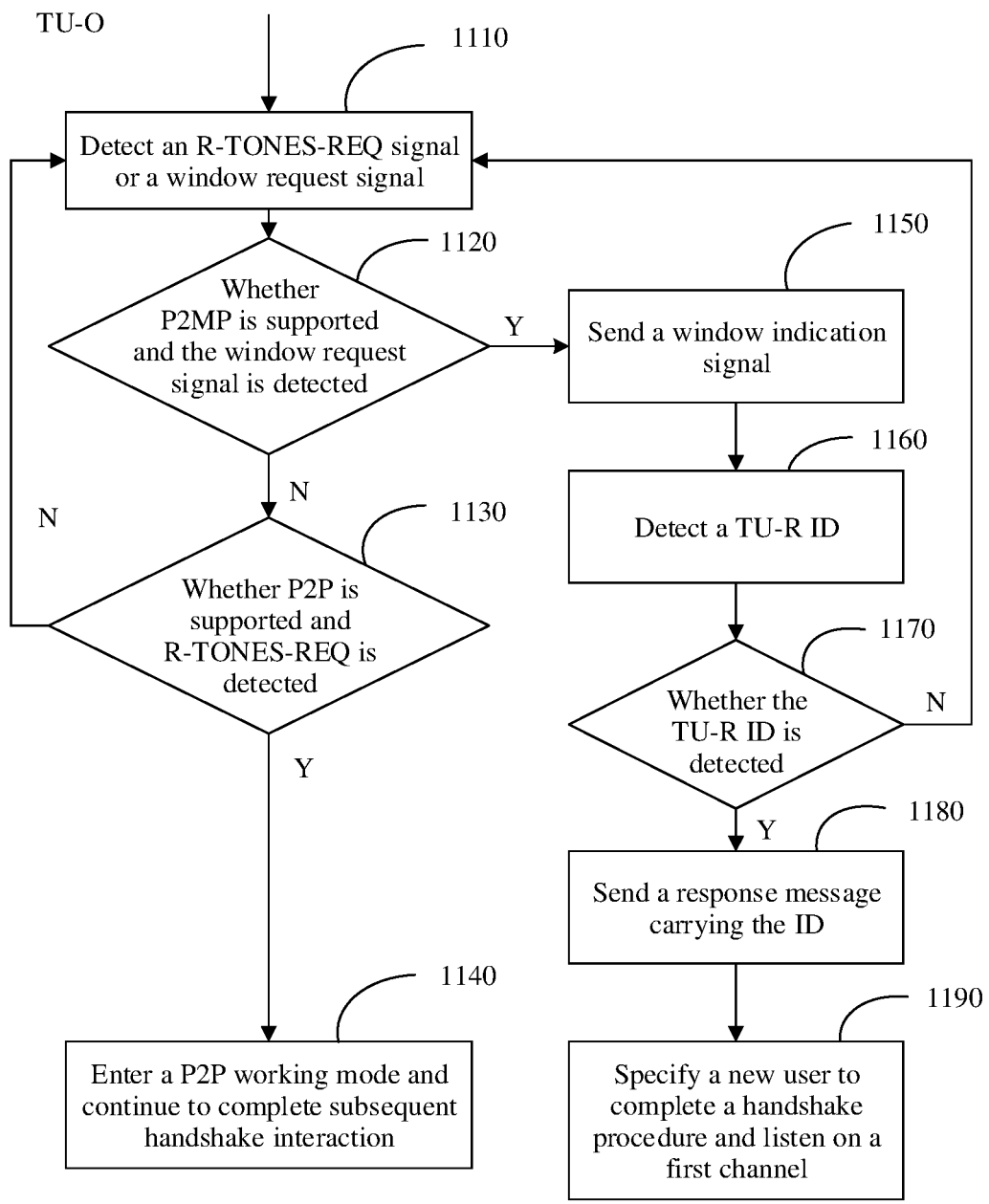
FIG. 11 is a schematic diagram of another possible working procedure of a network device in step 310 in FIG. 3.

The following describes, in more detail with reference to a specific example in FIG. 11, a specific implementation in which the network device in this embodiment of this application may receive, in the handshake toneset of the first port, a registration window request signal that is sent by the terminal device and carried on the same frequency band as the R-TONES-REQ signal in the existing handshake toneset but in a different form from the R-TONES-REQ signal. It should be noted that the example in FIG. 11 is merely intended to help a person skilled in the art understand the embodiments of this application, and is not intended to limit the embodiments of this application to a specific value or a specific scenario of the example. The person skilled in the art may apparently make various equivalent modifications or changes based on the example shown in FIG. 11, and such modifications and changes also fall within the scope of the embodiments of this application.

FIG. 11 is a schematic diagram of another possible working procedure of a network device in step 310 in FIG. 3. A method shown in FIG. 11 may include steps 1110 to 1190. Steps 1110 to 1190 are separately described in detail below.

It should be understood that the network device in FIG. 11 may correspond to the TU-O 234 shown in FIG. 2. A working procedure of the TU-O is used as an example below for detailed description.

For ease of description, in this embodiment of this application, a channel different from a handshake toneset is referred to as a first channel.

Step 1110: The TU-O detects an R-TONE-REQ signal or a registration window request signal.

After being powered on, the TU-O may detect, in a handshake toneset, an R-TONES-REQ signal or a registration window request signal sent by a TU-R.

If the TU-O detects, in the handshake toneset, the R-TONES-REQ signal sent by the TU-R, the R-TONES-REQ signal may be used to indicate that the TU-R enters a P2P working mode.

If the TU-O detects, in the handshake toneset, the registration window request signal sent by the TU-R, the registration window request signal may be used to indicate that the TU-R enters a P2MP working mode.

Step 1120: Determine whether the TU-O supports the P2MP working mode and whether the TU-O detects the registration window request signal.

If the TU-O does not support the P2MP working mode, and does not detect, in the handshake toneset, the registration window request signal sent by the TU-R, the TU-O may perform steps 1130 to 1140.

If the TU-O supports the P2MP working mode, and detects, in the handshake toneset, the registration window request signal sent by the TU-R, the TU-O may perform steps 1150 to 1170.

Step 1130: Determine whether the TU-O supports the P2P working mode and whether the TU-O detects the R-TONES-REQ signal.

If the TU-O supports the P2P working mode, and detects, in the handshake toneset, the R-TONES-REQ signal sent by the TU-R, the TU-O may perform step 1140.

If the TU-O does not support the P2P working mode, and does not detect, in the handshake toneset, the R-TONES-REQ signal sent by the TU-R, the TU-O may perform step 1110 again.

Step 1140: The TU-O enters the P2P working mode, and continues to complete handshake interaction.

After receiving, in the handshake toneset, the R-TONES-REQ signal sent by the TU-R, the TU-O may enter the P2P working mode, and may continue to complete a subsequent handshake protocol.

It should be noted that if the TU-O later works in the P2P working mode, the TU-O no longer supports the P2MP working mode.

Step 1150: The TU-O sends a registration window indication signal.

The TU-O may send the registration window indication signal after supporting the P2MP working mode and detecting, in the handshake toneset, the registration window request signal sent by the TU-R.

Step 1160: Determine whether the TU-O detects an ID of the TU-R.

After sending a C-IND signal, the TU-O may determine whether registration information sent by the TU-R may be detected, and the registration information may include the unique identifier ID of the TU-R. The ID of the TU-R may be, for example, a MAC address.

If the TU-O detects, in an indicated registration window, the registration information sent by the TU-R, and the registration information includes the ID of the TU-R, the TU-O may perform step 1180.

If the TU-O does not detect the ID of the TU-R, the TU-O may perform step 1110 again.

Step 1180: The TU-O sends a response message that carries the ID.

The TU-O detects, in the indicated registration window, uplink registration information sent by the TU-R, the TU-O responds to correctly parsed uplink registration information.

Step 1190: The TU-O specifies that a newly registered user completes a handshake procedure, and detects the handshake toneset.

After entering the P2MP working mode, the TU-O may allocate an ID to a successfully registered TU-R. The TU-O may specify that the TU-R enters a subsequent initialization procedure, such as a handshake protocol procedure.

Corresponding to an implementation in which the network device shown in FIG. 11 receives, in a handshake toneset of a first port, the registration window request signal sent by the terminal device (for example, the TU-R), in this embodiment of this application, there are also two implementations in which the terminal device sends the registration window request signal. For example, the terminal device may send the R-TONES-REQ signal or the registration window request signal in handshake toneset. For another example, the terminal device may first detect whether there is registration window indication information sent by the network device; and if there is no registration window indication information, the terminal device sends the R-TONES-REQ signal or the registration window request signal in the handshake toneset.

Figure 12:
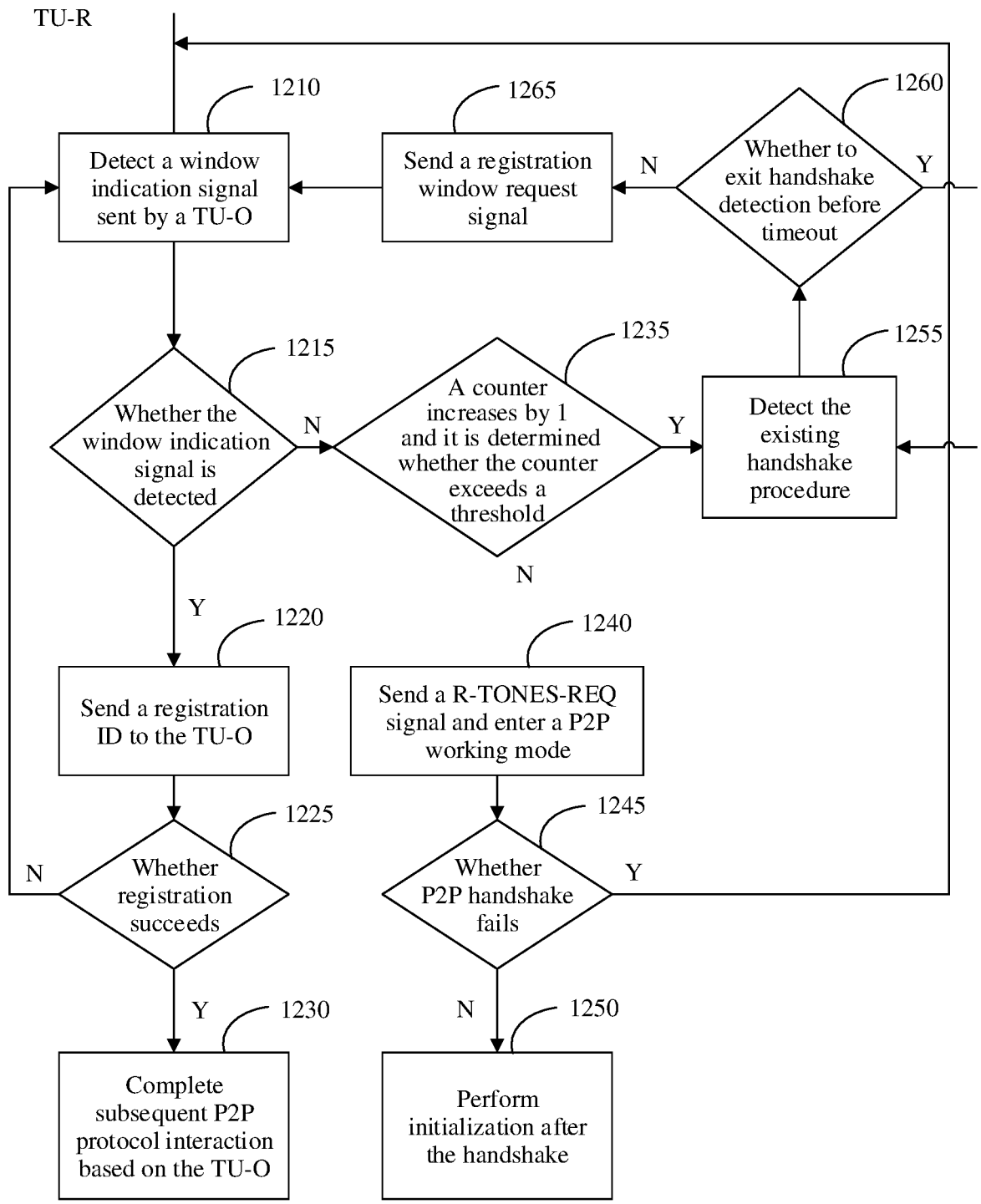
FIG. 12 is a schematic diagram of another possible working procedure of a terminal device in step 310 in FIG. 3.

Corresponding to FIG. 11, the following describes, in more detail with reference to a specific example in FIG. 12, a specific implementation in which the terminal device in this embodiment of this application may first detect whether there is registration window indication information sent by the network device, and if there is no window indication information, the terminal device sends an R-TONES-REQ signal or a registration window request signal in a handshake toneset. It should be noted that the example in FIG. 12 is merely intended to help a person skilled in the art understand the embodiments of this application, and is not intended to limit the embodiments of this application to a specific value or a specific scenario of the example. The person skilled in the art may apparently make various equivalent modifications or changes based on the example shown in FIG. 12, and such modifications and changes also fall within the scope of the embodiments of this application.

FIG. 12 is a schematic diagram of another possible working procedure of a terminal device in step 310 in FIG. 3. A method shown in FIG. 12 may include steps 1210 to 1265. Steps 1210 to 1265 are separately described in detail below.

It should be understood that the terminal device in FIG. 12 may correspond to the TU-R 236 shown in FIG. 2. A working procedure of the TU-R is used as an example below for detailed description.

For ease of description, in this embodiment of this application, a channel different from a handshake toneset is referred to as a first channel.

Step 1210: The TU-R detects registration window indication information sent by a TU-O.

Step 1215: Determine whether the TU-R detects the registration window indication information before timeout.

If the TU-R detects, before timeout, the registration window indication information sent by the TU-O, the TU-R may perform steps 1220 and 1225.

If the TU-R does not detect, before timeout, the registration window indication information sent by the TU-O, the TU-R may perform steps 1235 to 1245.

Step 1220: The TU-R sends a registration ID of the TU-R to the TU-O.

If the TU-R detects, before timeout, the registration window indication information sent by the TU-O, the TU-R may send registration information to the TU-O, and the registration information may include the ID of the TU-R. The ID of the TU-R may be used to indicate a MAC address of the TU-R.

Step 1225: Determine whether registration of the TU-R succeeds.

After sending the registration information at an uplink registration window location specified by the TU-O in FIG. 11, the TU-R may determine whether a response message sent by the TU-O may be correctly received.

If the TU-R receives the response message sent by the TU-O, registration of the TU-R succeeds, and step 1230 may be performed.

If the TU-R does not receive the response message sent by the TU-O, registration of the TU-R fails, and step 1210 may be performed again.

Step 1230: The TU-R performs subsequent interaction based on the TU-O to enter show time.

After successful registration, the TU-R may obtain an ID allocated by the TU-O in FIG. 11, may enter a subsequent initialization procedure such as a handshake protocol procedure based on a mode indicated or predefined by the TU-O, and may enter the show time after initialization.

Step 1235: A counter increases by 1 and it is determined whether the counter exceeds a threshold.

If the TU-R does not detect, before timeout, an uplink registration window indication signal sent by the TU-O in FIG. 11, a timeout timer may increase by 1.

If the counter of the TU-R exceeds the threshold, the TU-O may not support a P2MP working mode, and the TU-R may perform step 1240.

If the counter of the TU-R does not exceed the threshold, the TU-R may perform step 1255.

Step 1240: The TU-R sends an R-TONES-REQ signal and enters a P2P working mode.

If the counter of the TU-R exceeds the threshold, the TU-O may not support the P2MP working mode. The TU-R may send the R-TONES-REQ signal to the TU-O, and the signal may be used to indicate that the TU-R enters the P2P working mode.

Step 1245: Determine whether handshake of the TU-R fails.

After sending the R-TONES-REQ signal to the TU-O and entering the P2P working mode, the TU-R may continue to complete a subsequent handshake protocol.

If the handshake of the TU-R succeeds, the TU-R may perform step 1250.

If the handshake of the TU-R fails, the TU-R may perform step 1210 again.

Step 1250: The TU-R performs initialization after the handshake.

After the handshake succeeds, the TU-R may enter an initialization stage.

Step 1255: The TU-R detects the existing handshake.

If the counter of the TU-R does not exceed the threshold, the TU-R may detect the existing handshake.

Step 1260: Determine whether the TU-R exits the handshake detection before timeout.

If the TU-R exits the handshake detection before timeout, the TU-R may perform step 1265.

If the TU-R does not exit the handshake detection before timeout, the TU-R may perform step 1255 again.

Step 1265: The TU-R sends an uplink registration window request signal (for example, a registration window request signal).

After sending the registration window request signal to the TU-O, the TU-R may continue to perform step 1210, and may continue to detect the registration window indication information sent by the TU-O.

Optionally, in some embodiments, the TU-R may further directly send the registration window indication information without first detecting whether the TU-O sends the registration window indication information in step 1210.

The uplink access method according to the embodiments of the present invention is described in detail above with reference to FIG. 1 to FIG. 12. Apparatus embodiments of this application are described in detail below with reference to FIG. 13 to FIG. 16. It should be understood that description of the method embodiment corresponds to description of the apparatus embodiment. Therefore, for any part that is not described in detail, refer to the foregoing method embodiment.

Figure 13:
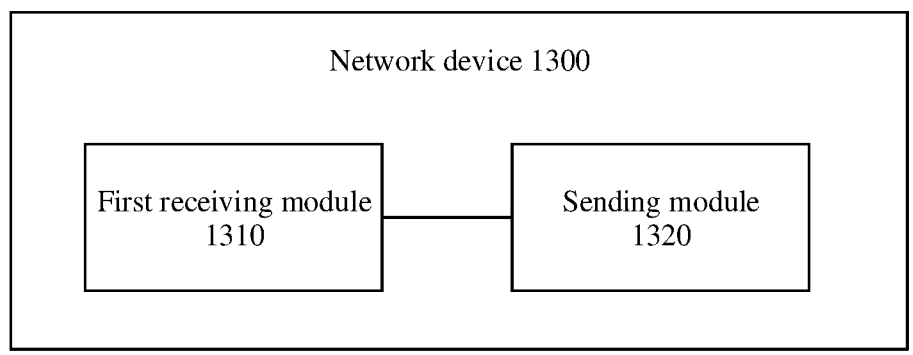
FIG. 13 is a schematic block diagram of a network device 1300 according to an embodiment of this application.

FIG. 13 is a schematic block diagram of a network device 1300 according to an embodiment of this application. Each module in the network device 1300 is configured to perform each action or processing process performed by the network device in the foregoing method. To avoid repetition, for detailed description, refer to the foregoing description.

FIG. 13 is a schematic block diagram of a network device 1300 according to an embodiment of this application. The network device 1300 may include:

a first receiving module 1310, configured to receive first indication information sent by a terminal device when the terminal device goes online; and a sending module 1320, configured to send uplink registration window indication information on a first port according to the first indication information.

Optionally, in some embodiments, the first receiving module 1310 is configured to receive, on a first channel of the first port, the first indication information sent by the terminal device, and the first indication information is a signal carried on a different frequency band from a frequency band of a second channel.

Optionally, in some embodiments, the first receiving module 1310 is further configured to receive, on the second channel of the first port, second indication information sent by the terminal device, and the second indication information is a signal carried on a frequency band that is the same as the frequency band of the second channel.

Optionally, in some embodiments, when the second indication information is a signal carried on a same frequency band as an existing handshake protocol signal R-TONES-REQ on the second channel, but in a different signal form from the R-TONES-REQ signal, the sending module 1320 is configured to send the uplink registration window indication information on the first channel of the first port according to the first indication information.

Optionally, in some embodiments, when the second indication information is a signal in a same form as the R-TONES-REQ signal in the existing handshake protocol of the second channel, the sending module 1320 is further configured to perform a handshake protocol procedure on the second channel of the first port.

Figure 14:
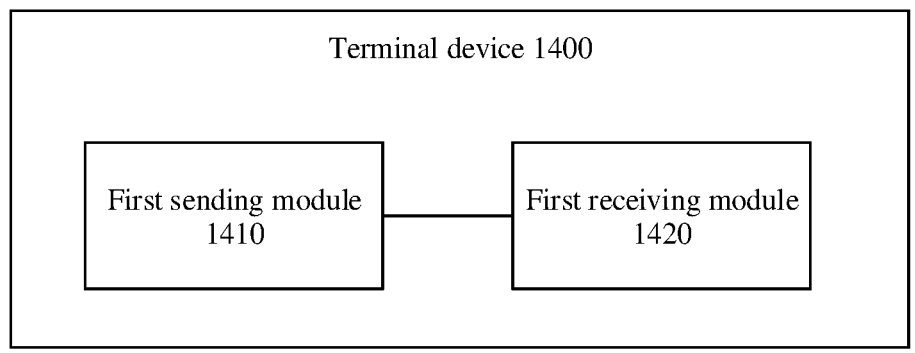
FIG. 14 is a schematic block diagram of a terminal device 1400 according to an embodiment of this application.

FIG. 14 is a schematic block diagram of a terminal device 1400 according to an embodiment of this application. Each module in the terminal device 1400 is configured to perform each action or processing process performed by the network device in the foregoing method. To avoid repetition, for detailed description, refer to the foregoing description.

FIG. 14 is a schematic block diagram of a terminal device 1400 according to an embodiment of this application. The terminal device 1400 may include:

a first sending module 1410, configured to send indication information to a network device on a first port when the terminal device goes online; and a first receiving module 1420, configured to receive, on a second port, uplink registration window indication information sent by the network device.

The indication information is used to trigger the network device to send the uplink registration window indication information on the first port, and the uplink registration window indication information indicates a registration window location at which the terminal device sends uplink registration information.

It should be understood that the second port corresponds to the first port on which the network device receives the indication information.

Optionally, in some embodiments, the first sending module 1410 is configured to send first indication information to the network device on a first channel of the second port, and the first indication information is a signal carried on a different frequency band from a frequency band of a second channel.

Optionally, in some embodiments, the first sending module 1410 is configured to send second indication information to the network device on a second channel of the second port, and the second indication information is a signal carried on a frequency band that is the same as the frequency band of the second channel.

Optionally, in some embodiments, the terminal device 1400 further includes a processing module 1430.

The processing module 1430 is configured to: when the terminal device detects an existing handshake protocol signal on the second channel, wait for completion of a handshake protocol procedure.

Optionally, in some embodiments, the terminal device further includes a second sending module 1440.

The second sending module 1440 is configured to: when the uplink registration window indication information is not received on the second port before timeout, send, by the terminal device, the second indication information to the network device on the second channel of the second port.

Optionally, in some embodiments, the terminal device 1400 further includes a second receiving module 1450.

The second receiving module 1450 is configured to: when the uplink registration window indication information is received on the first channel of the second port, send, by the terminal device, registration information to the network device at the indicated registration window location.

Figure 15:
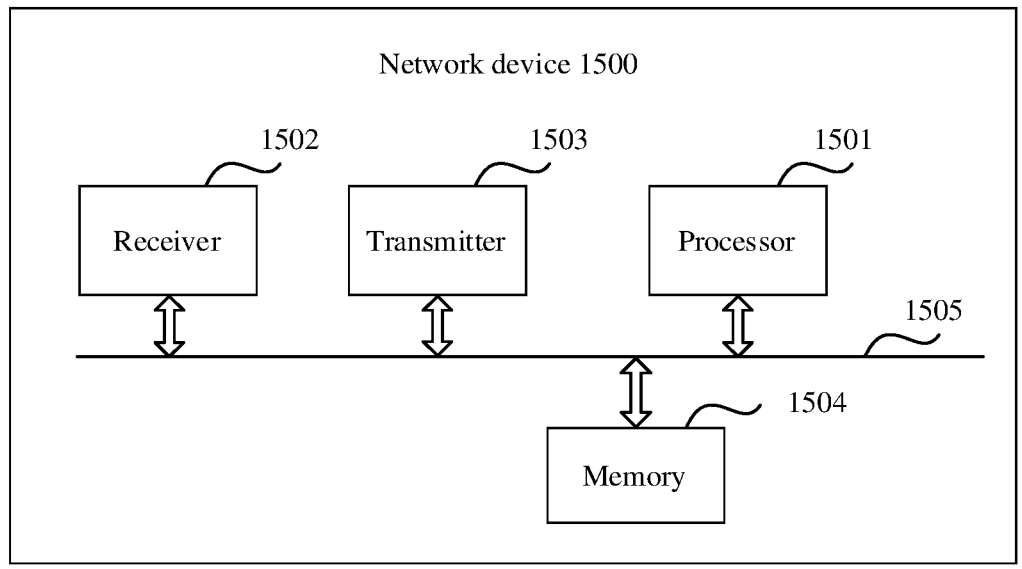
FIG. 15 is a schematic block diagram of a network device 1500 according to an embodiment of this application.

FIG. 15 is a schematic block diagram of a network device 1500 according to an embodiment of this application. The network device 1500 may include a processor 1501, a receiver 1502, a transmitter 1503, and a memory 1504.

The processor 1501 may be communicatively connected to the receiver 1502 and the transmitter 1503. The memory 1504 may be configured to store program code and data of the network device. Therefore, the memory 1504 may be an internal storage unit of the processor 1501, may be an external storage unit independent of the processor 1501, or may be a part including an internal storage unit of the processor 1501 and an external storage unit independent of the processor 1501.

Optionally, the network device 1500 may further include a bus 1505. The receiver 1502, the transmitter 1503, and the memory 1504 may be connected to the processor 1501 by using the bus 1505. The bus 1505 may be a peripheral component interconnection standard (PCI) bus, an extended industry standard architecture (EISA) bus, or the like. The bus 1505 may be classified into an address bus, a data bus, a control bus, and the like. For ease of representation, only one thick line is used to represent the bus in FIG. 15, but this does not mean that there is only one bus or only one type of bus.

The processor 1501 may be a central processing unit (CPU), a general-purpose processor, a digital signal processor (DSP), an application-specific integrated circuit (ASIC), a field programmable gate array (FPGA), another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

The receiver 1502 and the transmitter 1503 may be circuits including an antenna, transmitter chain, and receiver chain, and may be independent circuits, or may be a same circuit.

When a program is executed, the receiver 1502 is configured to receive indication information sent by a terminal device when the terminal device goes online.

The transmitter 1503 performs the following operation by using the processor 1501: sending uplink registration window indication information on a first port according to the indication information.

Optionally, in some embodiments, the receiver 1502 is configured to receive, on a first channel of the first port, first indication information sent by the terminal device, and the first indication information is carried on a frequency band which is different from that of a second channel.

Optionally, in some embodiments, the receiver 1502 is further configured to receive, on the second channel of the first port, second indication information sent by the terminal device, and the second indication information is carried on a frequency band which is the same as that of the second channel.

Optionally, in some embodiments, when the second indication information is a signal t carried on a same frequency band as an existing handshake protocol signal R-TONES-REQ on the second channel, but in a different signal form from the R-TONES-REQ signal, the transmitter 1503 is configured to send the uplink registration window indication information on the first channel of the first port according to the first indication information.

Optionally, in some embodiments, when the second indication information is a signal in a same form as the R-TONES-REQ signal in the existing handshake protocol of the second channel, the transmitter 1503 is further configured to perform a handshake protocol procedure on the second channel of the first port.

Figure 16:
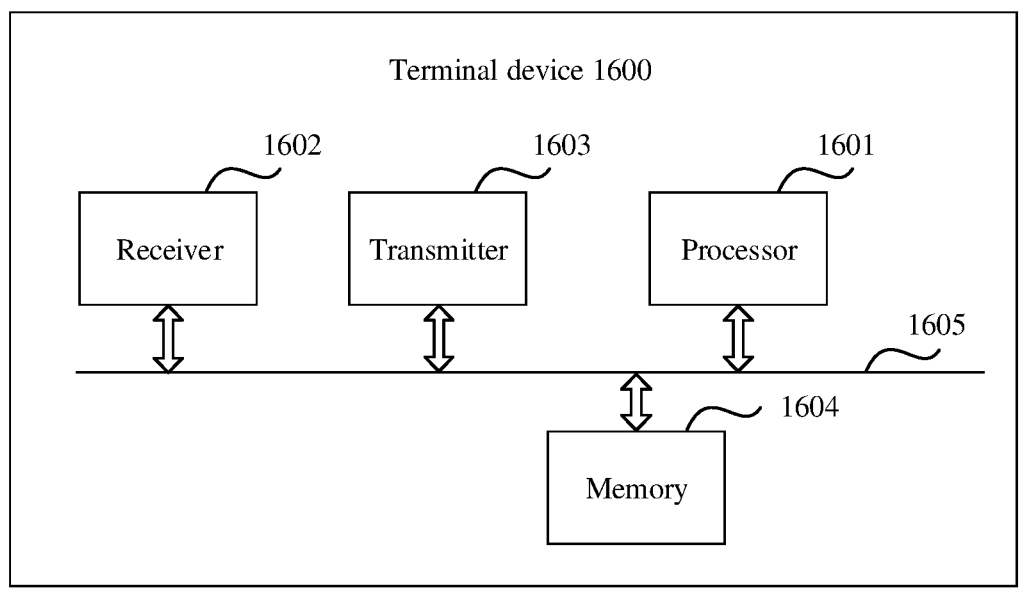
FIG. 16 is a schematic block diagram of a terminal device 1600 according to an embodiment of this application.

FIG. 16 is a schematic block diagram of a terminal device 1600 according to an embodiment of this application. The terminal device 1600 may include a processor 1601, a receiver 1602, a transmitter 1603, and a memory 1604.

The processor 1601 may be communicatively connected to the receiver 1602 and the transmitter 1603. The memory 1604 may be configured to store program code and data of the terminal device. Therefore, the memory 1604 may be an internal storage unit of the processor 1601, may be an external storage unit independent of the processor 1601, or may be a part including an internal storage unit of the processor 1601 and an external storage unit independent of the processor 1601.

Optionally, the terminal device 1600 may further include a bus 1605. The receiver 1602, the transmitter 1603, and the memory 1604 may be connected to the processor 1601 by using the bus 1605. The bus 1605 may be a peripheral component interconnection standard (PCI) bus, an extended industry standard architecture (EISA) bus, or the like. The bus 1605 may be classified into an address bus, a data bus, a control bus, and the like. For ease of representation, only one thick line is used to represent the bus in FIG. 16, but this does not mean that there is only one bus or only one type of bus.

The processor 1601 may be a central processing unit (CPU), a general-purpose processor, a digital signal processor (DSP), an application-specific integrated circuit (ASIC), a field programmable gate array (FPGA), another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

The receiver 1602 and the transmitter 1603 may be circuits including the foregoing antenna, transmitter chain, and receiver chain, and may be independent circuits, or may be a same circuit.

When a program is executed, the transmitter 1603 is configured to send indication information to a network device on a second port when the terminal device goes online.

The receiver 1602 is configured to receive, on the second port, uplink registration window indication information sent by the network device.

The first indication information is used to trigger the network device to send the uplink registration window indication information on a first port, and the uplink registration window indication information indicates a registration window location at which the terminal device sends uplink registration information.

It should be understood that the second port corresponds to the first port on which the network device receives the indication information.

Optionally, in some embodiments, the transmitter 1603 is configured to send, by the terminal device, first indication information to the network device on a first channel of the second port, and the first indication information is a signal carried on a different frequency band from a frequency band of a second channel.

Optionally, in some embodiments, the transmitter 1603 is configured to send second indication information to the network device on a second channel of the second port, and the second indication information is a signal carried on a frequency band that is the same as the frequency band of the second channel.

Optionally, in some embodiments, the processor 1601 is configured to: when the terminal device detects an existing handshake protocol signal on the second channel, wait for completion of a handshake protocol procedure.

Optionally, in some embodiments, the transmitter 1603 is further configured to: when the uplink registration window indication information is not received on the second port before timeout, send, by the terminal device, the second indication information to the network device on the second channel of the second port.

Optionally, in some embodiments, the transmitter 1603 is further configured to: when the uplink registration window indication information is received on the first channel of the second port, send, by the terminal device, registration information to the network device at the indicated registration window location.

An embodiment of this application further provides a chip, including a memory, a processor, and a transceiver. The memory is configured to store a program. The processor is configured to execute the program stored in the memory, and when the program is executed, the processor performs the method in any possible implementation of the foregoing network device.

An embodiment of this application further provides a chip, including a memory, a processor, and a transceiver. The memory is configured to store a program. The processor is configured to execute the program stored in the memory, and when the program is executed, the processor performs the method in any possible implementation of the foregoing terminal device.

An embodiment of this application further provides a computer readable storage medium, including a computer program. When the computer program runs on a computer, the computer is enabled to perform the method described in steps 310 to 320 and the like.

An embodiment of this application further provides a computer program product. When the computer program product runs on a computer, the computer is enabled to perform the method described in steps 310 to 320 and the like.

An embodiment of this application further provides a system, including the foregoing terminal device and/or the foregoing network device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments.

In addition, aspects or features of this application may be implemented as a method, an apparatus, or a product that uses standard programming and/or engineering technologies. The term "product" used in this application covers a computer program that may be accessed from any computer readable component, carrier, or medium. For example, the computer readable medium may include but is not limited to: a magnetic storage component (for example, a hard disk, a floppy disk, or a magnetic tape), an optical disc (for example, a compact disc (CD), a digital versatile disc (DVD), a smart card and a flash memory component (for example, erasable programmable read-only memory (EPROM), a card, a stick, or a key drive). In addition, various storage media described in this specification may indicate one or more devices and/or other machine-readable media that are configured to store information. The term "machine-readable medium" may include but is not limited to a radio channel, and various other media that may store, contain, and/or carry an instruction and/or data.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that may store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for providing uplink access, the method comprising:
  receiving, by a network device, indication information sent by a terminal device when the terminal device goes online, wherein the indication information is used to trigger the network device to send uplink registration window indication information on a first port, and the uplink registration window indication information indicates a registration window location at which the terminal device sends uplink registration information; and
  sending, by the network device, the uplink registration window indication information on the first port according to the indication information.

2. The method according to claim 1, wherein receiving the indication information comprises:
  receiving, by the network device on a first channel of the first port, first indication information sent by the terminal device, wherein the first indication information includes a signal carried on a different frequency band from a second channel.

3. The method according to claim 1, wherein receiving the indication information comprises:
  receiving, by the network device, on a second channel of the first port, second indication information sent by the terminal device, wherein the second indication information includes a signal carried on a same frequency band as the second channel.

4. The method according to claim 3, wherein
  the second indication information includes a signal carried on a same frequency band as an existing handshake protocol signal R-TONES-REQ on the second channel, but in a different signal form from the R-TONES-REQ signal; and sending the uplink registration window indication information on the first port according to the indication information comprises:
sending, by the network device, the uplink registration window indication information on the first channel of the first port according to the first indication information.

5. The method according to claim 4, wherein when the second indication information is a signal in a same form as the existing handshake protocol signal R-TONES-REQ on the second channel, the method further comprises:
performing, by the network device, a handshake protocol procedure on the second channel of the first port.

6. A method for providing uplink access, the method comprising:
sending, by a terminal device, indication information to a network device on a second port when the terminal device goes online, wherein the indication information is used to trigger the network device to send uplink registration window indication information on a first port, the uplink registration window indication information indicates a registration window location at which the terminal device sends uplink registration information, and the second port corresponds to the first port on which the network device receives the indication information; and
receiving, by the terminal device on the second port, the uplink registration window indication information sent by the network device.

7. The method according to claim 6, wherein sending the indication information to the network device comprises:
sending, by the terminal device, first indication information to the network device on a first channel of the second port, wherein the first indication information includes a signal carried on a different frequency band from a second channel.

8. The method according to claim 7, wherein sending the indication information to the network device comprises:
sending, by the terminal device, second indication information to the network device on the second channel of the second port, wherein the second indication information includes a signal carried on a same frequency band as the second channel.

9. The method according to claim 8, wherein before sending the second indication information to the network device on the second channel of the second port, the method further comprises:
when the terminal device detects an existing handshake protocol signal on the second channel, waiting for completion of a handshake protocol procedure.

10. The method according to claim 6, further comprising:
when the terminal device does not receive the uplink registration window indication information on the second port before timeout, sending, by the terminal device, second indication information to the network device on the second channel of the second port.

11. The method according to claim 6, wherein before sending the indication information to the network device, the method further comprises:
when the terminal device receives the uplink registration window indication information on the first channel of the second port, sending, by the terminal device, the registration information to the network device at the indicated registration window location.

12. A network device, comprising:
a memory;
a processor; and
a transceiver, wherein the memory is configured to store a program that, when executed by the processor, causes the network device to:
receive indication information sent by a terminal device when the terminal device goes online, wherein the indication information is used to trigger the network device to send uplink registration window indication information on a first port, and the uplink registration window indication information indicates a registration window location at which the terminal device sends uplink registration information; and
send the uplink registration window indication information on the first port according to the indication information.

13. The network device according to claim 12, wherein the network device is further caused to:
receive, on a first channel of the first port, first indication information sent by the terminal device, wherein the first indication information includes a signal carried on a different frequency band from a second channel.

14. The network device according to claim 12, wherein the network device is further caused to:
receive, by the network device, on a second channel of the first port, second indication information sent by the terminal device, wherein the second indication information includes a signal carried on a same frequency band as the second channel.

15. The network device according to claim 14, wherein the second indication information includes a signal carried on a same frequency band as an existing handshake protocol signal R-TONES-REQ on the second channel, but in a different signal form from the R-TONES-REQ signal;
wherein the network device is further caused to:
send the uplink registration window indication information on the first channel of the first port according to the first indication information.

16. A terminal device, comprising:
a memory;
a processor; and
a transceiver, wherein the memory is configured to store a program that, when executed by the terminal device, causes the terminal device to:
send indication information to a network device on a second port when the terminal device goes online, wherein the indication information is used to trigger the network device to send uplink registration window indication information on a first port, the uplink registration window indication information indicates a registration window location at which the terminal device sends uplink registration information, and the second port corresponds to the first port on which the network device receives the indication information; and
receive, on the second port, the uplink registration window indication information sent by the network device.

17. The terminal device according to claim 16, wherein the terminal device is further caused to:
send first indication information to the network device on a first channel of the second port, wherein the first indication information includes a signal carried on a different frequency band from a second channel.

18. The terminal device according to claim 17, wherein the terminal device is further caused to:

send second indication information to the network device on the second channel of the second port, wherein the second indication information includes a signal carried on a same frequency band as the second channel.

19. The terminal device according to claim 18, wherein the terminal device is further caused to:
when the terminal device detects an existing handshake protocol signal on the second channel, wait for completion of a handshake protocol procedure.

20. The terminal device according to claim 16, wherein the terminal device is further caused to:
when the terminal device does not receive the uplink registration window indication information on the second port before timeout, send second indication information to the network device on a second channel of the second port.

* * * * *